US012619873B2

(12) United States Patent
Mathur et al.

(10) Patent No.: US 12,619,873 B2
(45) Date of Patent: May 5, 2026

(54) PROVIDING UNLABELLED TRAINING DATA FOR TRAINING A COMPUTATIONAL MODEL

(71) Applicant: Nokia Technologies Oy, Espoo (FI)

(72) Inventors: Akhil Mathur, London (GB);
Chulhong Min, Cambridge (GB);
Fahim Kawsar, Cambridge (GB)

(73) Assignee: NOKIA TECHNOLOGIES OY,
Espoo (FI)

( * ) Notice: Subject to any disclaimer, the term of this patent is extended or adjusted under 35 U.S.C. 154(b) by 770 days.

(21) Appl. No.: 18/049,138

(22) Filed: Oct. 24, 2022

(65) Prior Publication Data

US 2023/0153611 A1 May 18, 2023

(30) Foreign Application Priority Data

Nov. 12, 2021 (FI) ..................................... 20216168

(51) Int. Cl.
*G06N 3/08* (2023.01)
*G06F 18/214* (2023.01)
*G06N 3/047* (2023.01)

(52) U.S. Cl.
CPC ............. *G06N 3/08* (2013.01); *G06F 18/214* (2023.01); *G06N 3/047* (2023.01)

(58) Field of Classification Search
CPC ........ G06F 21/56; G06F 16/55; G06F 18/211; G06F 18/214; G06F 18/2178;
(Continued)

(56) References Cited

U.S. PATENT DOCUMENTS

2013/0338948 A1* 12/2013 Zeifman ................ G01D 4/002
702/60
2018/0306609 A1 10/2018 Agarwal et al.
(Continued)

FOREIGN PATENT DOCUMENTS

CN 110781934 A 2/2020
CN 112149722 A 12/2020
(Continued)

OTHER PUBLICATIONS

Chen et al., "A simple framework for contrastive learning of visual representations", Proceedings of the 37th International Conference on Machine Learning, Jul. 2020, 11 pages.
(Continued)

*Primary Examiner* — Shyue Jiunn Hwa
(74) *Attorney, Agent, or Firm* — ALSTON & BIRD LLP

(57) ABSTRACT

Providing unlabelled training data for training a computational model comprises:

obtaining sets of time-aligned unlabelled data, wherein the sets correspond to different ones of a plurality of sensors;

marking a first sample, of a first set of the sets, as a positive sample, in dependence on statistical separation information indicating a first statistical similarity of at least a portion of the first set to the at least a portion of the reference set and in dependence on the first sample being time-aligned relative to a reference time;

marking a second sample, of a second set of the sets, as a negative sample, in dependence on statistical separation information indicating a second, lower statistical similarity, of at least a portion of the second set to the at least a portion of the reference set, and in dependence on the second sample being time-misaligned relative to the reference time.

20 Claims, 11 Drawing Sheets

(58) Field of Classification Search

CPC ........ G06N 3/045; G06N 20/00; G06N 3/084;
G06N 3/088; G06N 3/044; G06N 3/047;
G06N 3/08; G06N 20/10; G06N 3/082;
G06N 3/086; G06N 7/01; G06N 3/04;
G06N 3/0475; G06N 3/09; G06N 3/091;
G06N 3/096; G06N 5/04; G06N 20/20;
G06N 5/01; G06N 3/006; G06N 3/02;
G06N 3/048; G06N 3/092; G06N 5/022

See application file for complete search history.

(56) References Cited

U.S. PATENT DOCUMENTS

| | | | |
|---|---|---|---|
| 2020/0077892 A1 * | 3/2020 | Tran | G08B 21/02 |
| 2021/0089872 A1 | 3/2021 | Gan et al. | |
| 2022/0033880 A1 * | 2/2022 | Sina | C12Q 1/6886 |

FOREIGN PATENT DOCUMENTS

| | | |
|---|---|---|
| CN | 113313210 A | 8/2021 |
| WO | 2021/142532 A1 | 7/2021 |

OTHER PUBLICATIONS

Jing et al., "Self-supervised Visual Feature Learning with Deep Neural Networks: A Survey", arXiv, Feb. 16, 2019, pp. 1-24.

"Group Supervised Learning for Human Activity Recognition", Woodstock, ACM, Jun. 3-5, 2018, pp. 1-25.

Khaertdinov et al., Contrastive Self-supervised Learning for Sensor-based Human Activity Recognition, IEEE International Joint Conference on Biometrics (IJCB), Aug. 4-7, 2021, 8 pages.

Saeed at al., "Federated Self-Supervised Learning of Multi-Sensor Representations for Embedded Intelligence", arXiv, Jul. 25, 2020, pp. 1-11.

Haresamudram et al., "Contrastive Predictive Coding for Human Activity Recognition", arXiv, Dec. 9, 2020, pp. 1-23.

Saeed et al., "Multi-task Self-Supervised Learning for Human Activity Detection", arXiv, Jul. 27, 2019, pp. 1-31.

Sermanet et al., "Time-Contrastive Networks: Self-Supervised Learning from Video", arXiv, Mar. 20, 2018, pp. 1-15.

Sztyler et al., "On-body localization of wearable devices: An investigation of position-aware activity recognition", IEEE International Conference on Pervasive Computing and Communications (PerCom), Mar. 14-19, 2016, 9 Pages.

Roggen et al., "Collecting complex activity datasets in highly rich networked sensor environments", Seventh International Conference on Networked Sensing Systems (INSS), Jun. 15-18, 2010, 8 pages.

Reiss et al., "Introducing a new benchmarked dataset for activity monitoring", 16th International Symposium on Wearable Computers, Jun. 18-22, 2012, pp. 108-109.

Office Action received for corresponding Finnish Patent Application No. 20216168, dated Jun. 10, 2022, 10 pages.

Banville et al., "Self-Supervised Representation Learning From Electroencephalography Signals", IEEE 29th International Workshop on Machine Learning for Signal Processing (MLSP), Oct. 13-16, 2019, 6 pages.

Khaertdinov et al., "Deep Triplet Networks with Attention for Sensor-based Human Activity Recognition", IEEE International Conference on Pervasive Computing and Communications (PerCom), Mar. 22-26, 2021, 10 pages.

Extended European Search Report received for corresponding European Patent Application No. 22206408.1, dated Mar. 30, 2023, 9 pages.

Office Action for Chinese Application No. 202211414049.2 dated Aug. 29, 2025, 12 pages.

* cited by examiner

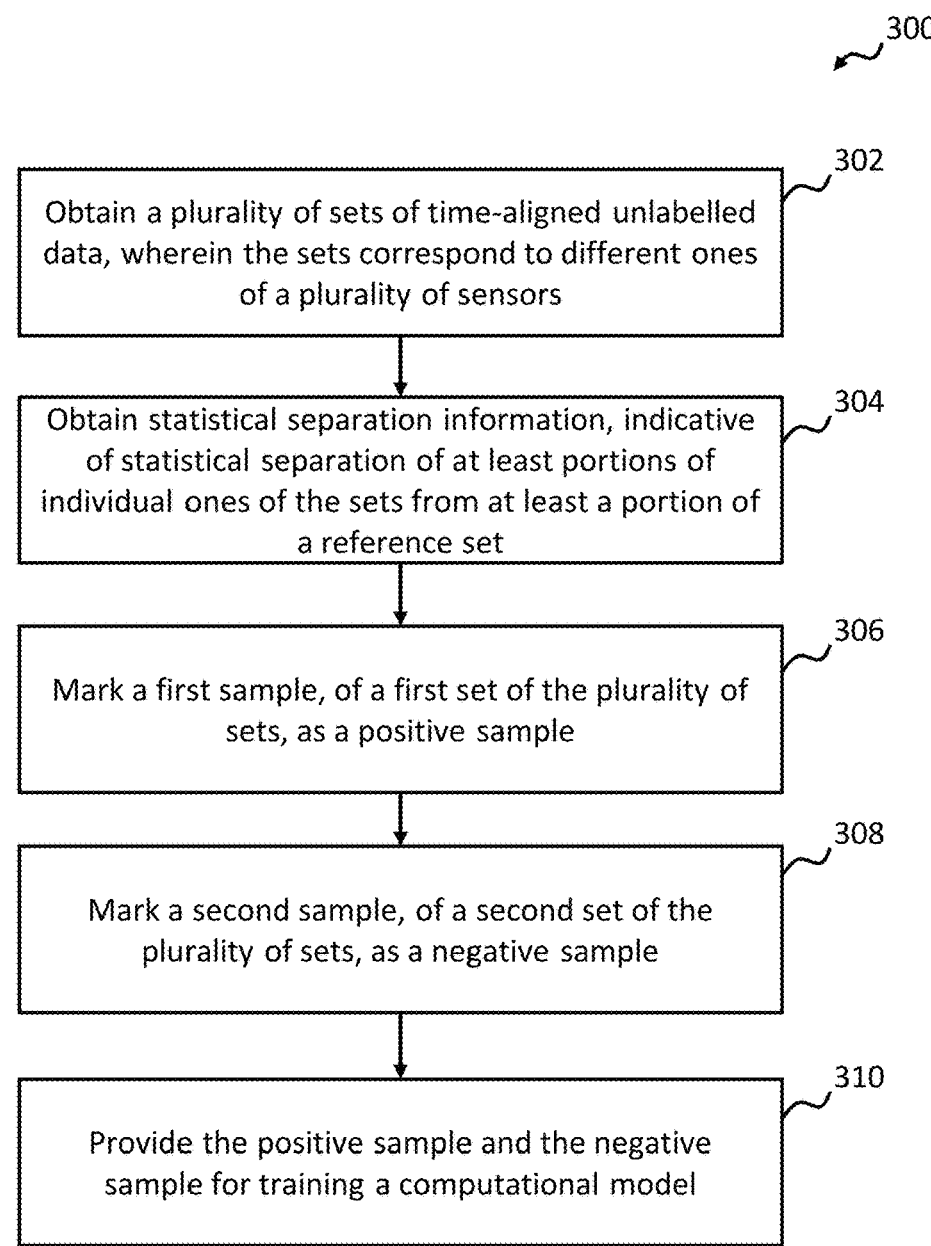

300

302
Obtain a plurality of sets of time-aligned unlabelled data, wherein the sets correspond to different ones of a plurality of sensors 304
Obtain statistical separation information, indicative of statistical separation of at least portions of individual ones of the sets from at least a portion of a reference set 306
Mark a first sample, of a first set of the plurality of sets, as a positive sample 308
Mark a second sample, of a second set of the plurality of sets, as a negative sample 310
Provide the positive sample and the negative sample for training a computational model

FIG. 3

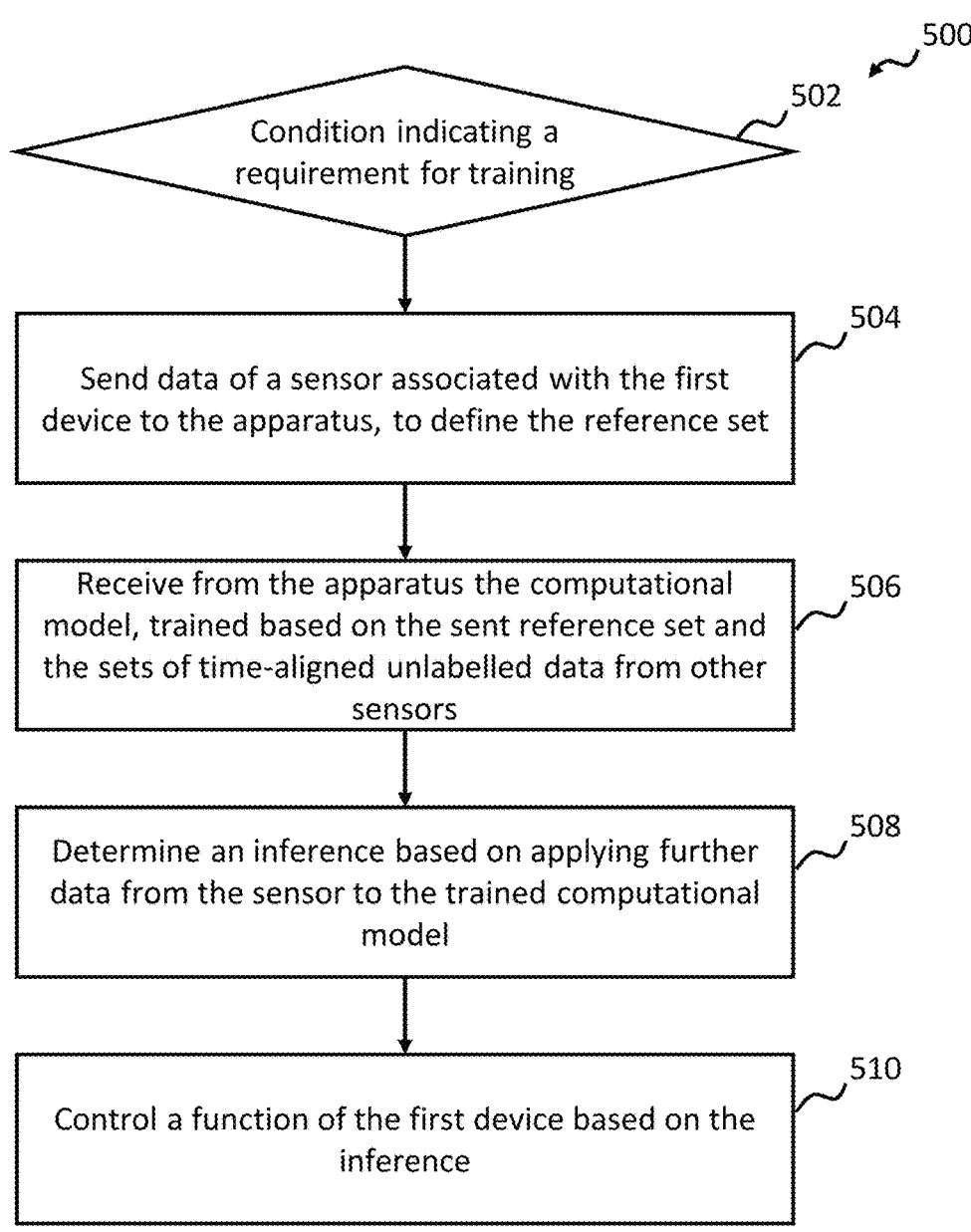

500

502

Condition indicating a
requirement for training

504

Send data of a sensor associated with the first
device to the apparatus, to define the reference set

506

Receive from the apparatus the computational
model, trained based on the sent reference set and
the sets of time-aligned unlabelled data from other
sensors

508

Determine an inference based on applying further
data from the sensor to the trained computational
model

510

Control a function of the first device based on the
inference

FIG. 5

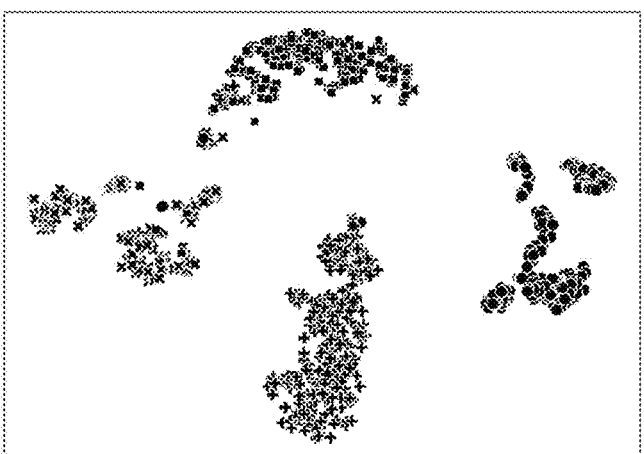
Position: Ankle
GSL w/ finetuning
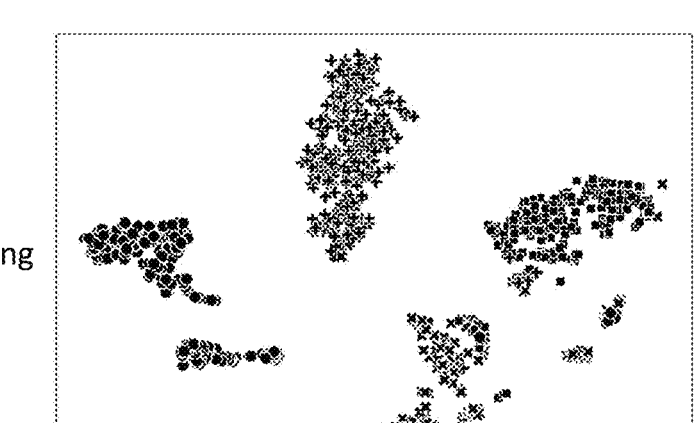
Position: Ankle
GSL w/o finetuning
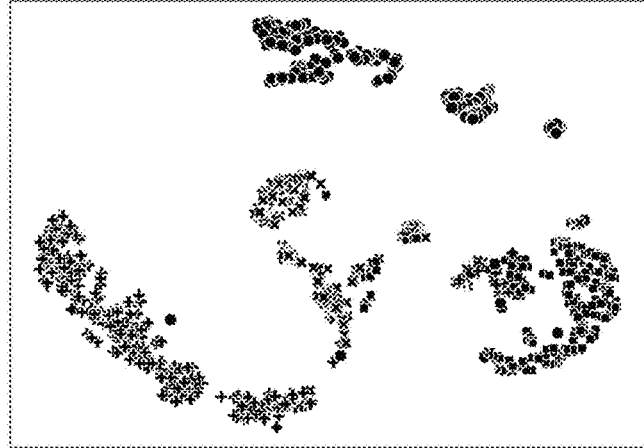
Position: Ankle
Fully Supervised
FIG. 9A

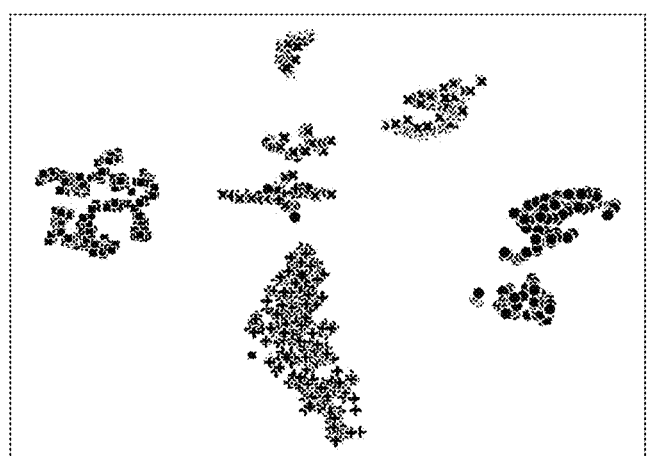
Position: Hand
GSL w/ finetuning
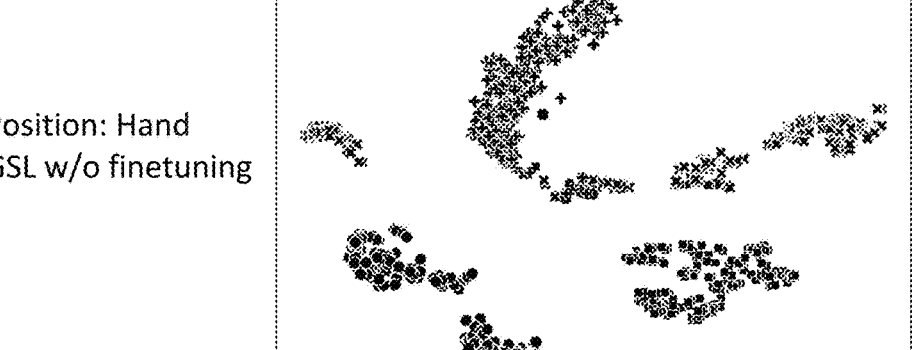
Position: Hand
GSL w/o finetuning
Position: Hand
Fully Supervised
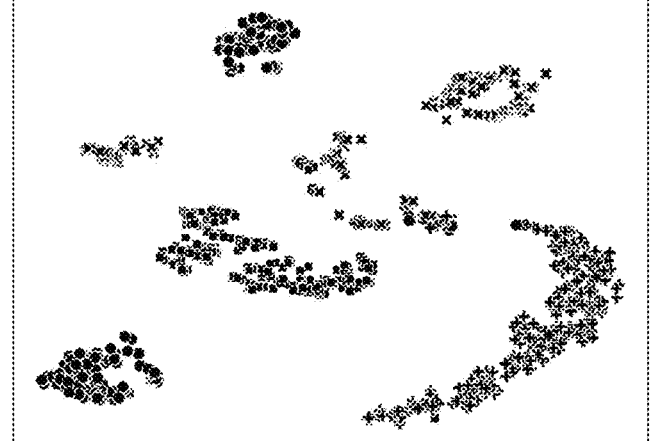
FIG. 9B

1200

1206

1300

1206

PROVIDING UNLABELLED TRAINING DATA FOR TRAINING A COMPUTATIONAL MODEL

TECHNOLOGICAL FIELD

Embodiments of the present disclosure relate to providing unlabelled training data for training a computational model. Some relate to training the computational model.

BACKGROUND

Supervised machine learning requires labelled data samples to train the computational model. Collection of labelled data for complex models, such as deep learning models, is cumbersome, especially outside of a laboratory.

Self-supervised machine learning (SSL) analyses unlabelled input data to derive a supervisory signal. However, pretext tasks for SSL are often hand-crafted (e.g., rotate image by 60 degrees) or rely on pretrained data, because the choice of pretext tasks can have a profound impact on the SSL performance. In addition, for sensor signals (e.g., accelerometer, gyroscope, electrocardiogram, skin conductance, etc.), it is difficult to manually define pretext tasks that could lead to learning of robust feature representations.

BRIEF SUMMARY

Embodiments of the present disclosure improve upon SSL in a manner that can be described as Group Supervised Learning (GSL), because it leverages the capabilities of a plurality of sensors measuring the same object, for preparing training samples.

According to various, but not necessarily all, embodiments there is provided an apparatus comprising means configured to, or means for:

obtaining a plurality of sets of time-aligned unlabelled data, wherein the sets correspond to different ones of a plurality of sensors;

obtaining statistical separation information, indicative of statistical separation of at least portions of individual ones of the sets from at least a portion of a reference set;

marking a first sample, of a first set of the plurality of sets, as a positive sample, in dependence on the statistical separation information indicating a first statistical similarity of at least a portion of the first set to the at least a portion of the reference set and in dependence on the first sample being time-aligned relative to a reference time;

marking a second sample, of a second set of the plurality of sets, as a negative sample, in dependence on the statistical separation information indicating a second, lower statistical similarity, of at least a portion of the second set to the at least a portion of the reference set, and further in dependence on the second sample being time-misaligned relative to the reference time; and providing the positive sample and the negative sample for training a computational model.

According to some but not necessarily all examples the time-aligned unlabelled data of the sets indicate a time-varying context of a common subject.

According to some but not necessarily all examples the plurality of the sensors comprises sensors having a same sensing modality.

According to some but not necessarily all examples the first sample and the second sample are within non-overlapping time windows.

According to various, but not necessarily all, embodiments there is provided a system comprising the apparatus, and one or more devices individually associated with different ones of the plurality of sensors.

According to various, but not necessarily all, embodiments there is provided a computer-implemented method comprising:

obtaining a plurality of sets of time-aligned unlabelled data, wherein the sets correspond to different ones of a plurality of sensors;

obtaining statistical separation information, indicative of statistical separation of at least portions of individual ones of the sets from at least a portion of a reference set;

marking a first sample, of a first set of the plurality of sets, as a positive sample, in dependence on the statistical separation information indicating a first statistical similarity of at least a portion of the first set to the at least a portion of the reference set and in dependence on the first sample being time-aligned relative to a reference time;

marking a second sample, of a second set of the plurality of sets, as a negative sample, in dependence on the statistical separation information indicating a second, lower statistical similarity, of at least a portion of the second set to the at least a portion of the reference set, and further in dependence on the second sample being time-misaligned relative to the reference time; and providing the positive sample and the negative sample for training a computational model.

According to various, but not necessarily all, embodiments there is provided a computer program that, when run on a computer, performs:

causing obtaining of a plurality of sets of time-aligned unlabelled data, wherein the sets correspond to different ones of a plurality of sensors;

causing obtaining of statistical separation information, indicative of statistical separation of at least portions of individual ones of the sets from at least a portion of a reference set;

causing marking of a first sample, of a first set of the plurality of sets, as a positive sample, in dependence on the statistical separation information indicating a first statistical similarity of at least a portion of the first set to the at least a portion of the reference set and in dependence on the first sample being time-aligned relative to a reference time;

causing marking of a second sample, of a second set of the plurality of sets, as a negative sample, in dependence on the statistical separation information indicating a second, lower statistical similarity, of at least a portion of the second set to the at least a portion of the reference set, and further in dependence on the second sample being time-misaligned relative to the reference time; and causing providing of the positive sample and the negative sample for training a computational model.

According to various, but not necessarily all, embodiments there is provided a device comprising:

at least one processor; and at least one memory including computer program code;

the at least one memory and the computer program code configured to, with the at least one processor, cause the device at least to:

record data of a sensor associated with the device;

define a set of the sensor data as a reference set;

receive from the apparatus a trained computational model, trained based on the sent reference set, and a plurality of sets of time-aligned unlabelled data from a plurality of other sensors;

determine an inference based on applying further data from the sensor to the trained computational model; and control a function of the device based on the inference.

According to various, but not necessarily all, embodiments there is provided a computer-implemented method comprising:

sending data of a sensor associated with a device to an apparatus, defining a reference set;

receiving from the apparatus a trained computational model, trained based on the sent reference set and a plurality of sets of time-aligned unlabelled data from a plurality of sensors, wherein the training is based on:

determining an inference based on applying further data from the sensor to the trained computational model; and controlling a function of the device based on the inference.

According to various, but not necessarily all, embodiments there is provided a non-transitory computer readable medium, or a computer product, comprising program instructions for causing an apparatus to perform at least the following:

causing sending of data of a sensor associated with the device to an apparatus, defining a reference set;

causing receiving from the apparatus a trained computational model, trained based on the sent reference set and a plurality of sets of time-aligned unlabelled data from a plurality of sensors, wherein the training is based on:

causing determining an inference based on applying further data from the sensor to the trained computational model; and causing controlling of a function of the device based on the inference.

BRIEF DESCRIPTION

Some examples will now be described with reference to the accompanying drawings in which:

FIG. 3 shows an example of a method;

FIG. 5 shows an example of a method;

FIGS. 9A-9B show example comparative t-SNE visualisations;

DETAILED DESCRIPTION

At least some of the implementations in this disclosure, but not necessarily all of them, are inspired by a key trend in consumer sensing devices, i.e., the availability of multiple sensing devices per user. The number of connected devices per user (most of them with sensing capabilities) has been rapidly increasing. It is projected that in future, an average user will routinely have multiple connected sensing devices with him/her, e.g., a smartphone, smartwatch, smart earbud, smart ring.

This presents a unique opportunity for self-supervised learning. Here, multiple devices on or around a user's body are capturing the same physical phenomenon (i.e., a user's activity) from different perspectives. For example, when a user is running, both a smartphone placed in the thigh pocket and a smartwatch worn on the wrist record sensor data for the running activity; however due to their unique placements on the body, they capture the data from different perspectives. The unlabelled data from the different devices could be interpreted as natural transformations of each other, and leveraged to design self-supervised learning techniques. In contrast to traditional self-supervised learning, the supervisory signal in this setting does not come from "self", but from other devices in the group. Hence, the term Group Supervised Learning (GSL) is used herein.

As will be described herein, GSL is applicable not only to determining a context of a user, but also to a multitude of other supervised learning use cases where different sensors having, for example, same or substantially similar modalities capture the context of the same subject at substantially the same time from different 'perspectives'.

Figure 1:
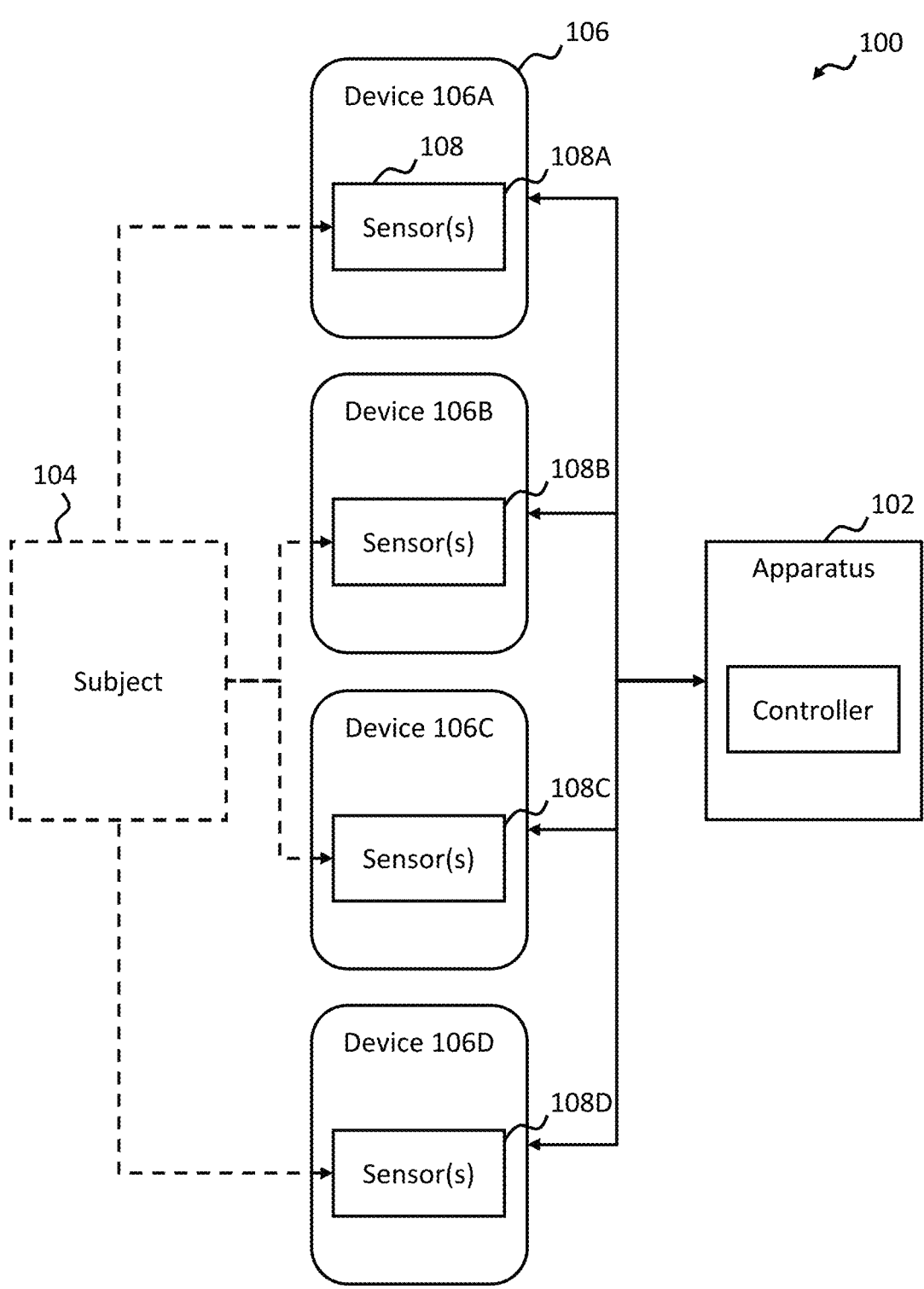
FIG. 1 shows an example of a system.

FIG. 1 illustrates a non-limiting example of a system 100 in which examples of the disclosure can be implemented.

The system 100 comprises a plurality of sensors 108 and an apparatus 102. The sensors 108 include, for example, the sensors 108A-108D, which are embedded in or communicatively connected to respective devices 106A-106D. In some examples, the system 100 further comprises a subject 104, that refers to one or more a device, a user, an object, a space or a scene that is being sensed.

The apparatus 102 comprises sufficient computing resources to obtain or receive datasets from the sensors 108A-108D and train a computational model as described herein.

In examples, the sensors 108A-108D, having substantially similar or at least partially different hardware and/or software structures, are associated with one or more devices 106 other than the apparatus 102.

Sensors 108A-108D having/measuring a same sensing modality may be deployed at more than one location relative to a subject 104 being sensed. For example, the plurality of sensors 108A-108D may be distributed across a plurality of devices 106A-106D, the devices 106A-106D being at different positions relative to the subject 104.

In some instances, the sensors 108A-108D are sufficiently proximal to the subject 104 that a change of related sensor data readings/measurements are substantially time-synchronous across the sensors 108A-108D and describe a same development or change in a context. To this end, the devices 106A-106D comprising the sensors 108A-108D may optionally be connectable to each other and/or to the apparatus 102 as part of a same small area wired or wireless network, such as a local area network (LAN), a personal area network (PAN), or body area network (BAN).

Therefore, in summary, the sensors 108A-108D are measuring the same subject 104 at substantially the same time, at different positions relative to the subject 104, wherein in some examples the positions can be optionally physically proximal to each other.

The system 100 could therefore be referred to as a 'Time-Synchronous Multi-Device System' (TSMDS). In the context of human-activity recognition, devices 106A-106D could be connected to a BAN in which multiple computing/sensor devices are worn on, affixed to or implanted in a person's body. In general, the characteristic of TSMDS is that all devices 106A-106D observe a physical phenomenon/modality (e.g., a user's locomotion activity) simultaneously and record sensor data in a time-aligned manner.

A TSMDS can be deployed in many other sensory applications. In a smart home network or environment, multiple voice assistant devices can listen to a user's speech and audio commands simultaneously. In a smart city network or environment, for example, in a camera network deployed on a traffic junction, multiple cameras can capture a same scene from different perspectives simultaneously. In a smart office/hospital network or environment, an example clinical use case comprises pressure sensors and/or motion sensors on the human body, for example to acquire clinical data for chronic pain management treatment or diagnosis. Another example clinical use case comprises, for example, blood pressure sensors and/or heart monitoring sensors on the human body to acquire clinical data for heart disease management treatment or diagnosis. An example localisation context comprises wireless local area or wide area network positioning, for example based on triangulation from a plurality of radio signal measurements by different antennas at different access points. This list is non-exhaustive and it would be within the capabilities of the skilled person to find further use cases equipped with the knowledge disclosed herein.

The one or more devices 106A-106D can comprise special-purpose sensor devices, and/or can comprise general-purpose computers that comprise sensors 108A-108D among other things, or the devices 106A-106D can be chipsets that comprise sensors 108A-108D thereof.

In some examples, one or more of the devices 106A-106D comprise one or more of a smart phone, a hand-portable device a laptop, a tablet computer; a pocket-portable device; a wearable (body-worn) device; a portable media player, a camera, an augmented reality (AR) display device, a virtual reality (VR) display device, an extended reality (XR) rendering device, a mobile communication device, a television, an audio/video streaming device, a vehicle, or the like, or any combination thereof. Examples of wearables include: a band-worn/wraparound device such as a watch (e.g., smartwatch) or ring; an implanted device (e.g., earable such as earbuds, or probe); an adhesive-mounted device (e.g., skin patch); and/or the like, or any combination thereof.

In some additional or alternative examples, the one or more devices 106A-106D comprise one or more Internet of Things (IoT) devices. Such devices are often, but not exclusively, special-purpose sensor devices measuring physiological variables of industrial processes, for example, vibration, rotation speed, temperature, electrical current and/or voltage, pH, and/or the like, or any combination thereof. Further, in some additional or alternative examples, the one or more of the devices 106A-106D comprise one or more of an industrial machinery, an electric motor, or the like, or any combination thereof.

In other or additional examples, the one or more devices 106A-106D are client-side devices, configured to communicate with the apparatus 102, which is edge/cloud-edge/server/cloud-side device.

In other or additional some examples, the apparatus 102 comprises a remote server separated from the devices 106A-106D by a wide area network (WAN). The server can be implemented as a cloud computing server or as a central server, for example.

In other or additional examples, the apparatus 102 is local to the devices 106A-106D. In some examples, the apparatus

102 can comprise an edge device such as a router, an access point, a base station or other gateway/access point.

In other or additional examples, the apparatus 102 is one of the devices 106A-106D or is comprised within one of the devices 106A-106D.

In some other or additional examples, the apparatus 102 is a vehicle and the devices 106A-106D are various devices in the vehicle.

In some other or additional examples, training of the computational model is distributed between multiple devices 102, 106A-106D. For example, collective computational resources may be utilised.

FIG. 1 illustrates each device comprising one or more sensors 108A-108D. Collectively, the sensors of the devices 106A-106D are configured to detect a time-varying context of a common subject 104.

The term 'subject' refers to the user or object, space or scene that is being sensed. If the subject 104 is a human or object, some or all of the sensors 108A-108D may be worn, carried, connected or otherwise attached to the subject 104. In various use cases, some or all of the sensors 108A-108D may not be in contact with the subject 104, but may nonetheless be arranged (e.g., positioned/oriented) to sense the context of a remote subject. If the subject 104 is associated with a particular physical location or field of view (e.g., for machine vision), the subject (e.g., road user, traffic sign, object on conveyor, etc.) may be within the fields of view of each of a plurality of image sensors. If the subject 104 is a vehicle, some or all of the sensors 108A-108D may be worn, carried, connected or otherwise attached to the vehicle itself, and some or all of the sensors 108A-108D may be worn, carried, connected or otherwise attached to another vehicle that is substantially similar to the vehicle itself.

In general, some or all of the sensors 108A-108D may be worn, carried, connected or otherwise attached or embedded to the subject 104 itself, and some or all of the sensors 108A-108D may be worn, carried, connected or otherwise attached to another separate subject that is substantially similar to the subject 104 itself.

The term 'context' refers to an activity, status or property that belongs to a universally-recognised class, wherein the task of training the computational model is to draw objectively accurate decision boundaries between different contexts (classes).

The term 'time-varying' refers to temporal data, including for example timestamped data. Examples include motion signals, physiological signals, video or audio signals.

Temporal data also includes spatiotemporal data, including for example a time history of localisation data which changes when the subject 104 moves.

In examples, the devices 106A-106D are configured to detect a 'persistent' time-varying context of the subject 104, in order to collect a substantial training dataset.

The term 'persistent' refers to an event that is not a single transient event, whether steady-state or not.

The context is persistent to the extent that the start time of a training sample can be changed one or more times without changing the class of the training sample. A good example is cyclic data such as walking/running or heart rate, diurnal data such as wake/sleep, or traffic patterns at a monitored junction.

In examples, all of the sensors 108A-108D have the same sensing modality, whether or not they use the same type of transducer, hardware and/or software. In other examples, some but not necessarily all of the utilised sensors 108A-

108D have the same sensing modality. In further examples, the modalities are different but well-correlated.

In some examples, a modality refers to input used by a specific sensor, for example, movement, velocity, acceleration, rotation, sound, force, temperature, light, pressure, electricity, magnetism, etc. In some additional or alternative examples, a modality refers to one or more measured data of physical attributes, features or properties relating to an input used by a specific sensor.

A non-exhaustive list of modalities and attributes of the sensed temporal data (i.e., the variables) comprises:

motion-dependent data (e.g., acceleration, velocity, angular motion, position, vibration);

force/pressure-dependent data (e.g., torque, strain, pressure);

image frame data (e.g., video, temporal sequence of images);

audio data (e.g., sound, volume, frequency);

radio signal data (e.g., wireless local area network positioning, radio signal strength, received signal strength (RSS), signal amplitude, signal frequency);

electricity data (e.g., electrical current and/or voltage)

In some examples, the sensors 108A-108D share the same sensor sampling rate, or their data can be re-sampled to the same rate by the apparatus 102. An advantage is that the dimensions of the data that will be fed to training of the computational model remain consistent across different sensors 108A-108D, to enable simplification of the architecture (e.g., neural network architecture) of the computational model.

In addition, the sensors 108A-108D are deployed in a manner that enables an inference that the sensors 108A-108D are collecting sensor data in a time-aligned (synchronised) manner. There could be timestamp noise or system clock misalignment across devices 106A-106D, which could skew the temporal alignment of multi-device datasets. However, timestamp noise for sensors is often small, for example, less than 10 milliseconds. It is hypothesised that such a small noise will not degrade the performance. In the absence of timestamp information for the sensed data, other alignment techniques could be used, for example based on feature detection or clock synchronisation. In some other or additional examples, the sensed data having timestamp noise or system clock misalignment across devices 106A-106D can be used as negative training samples in a computational model training, as will be later described in this specification.

Figure 2:
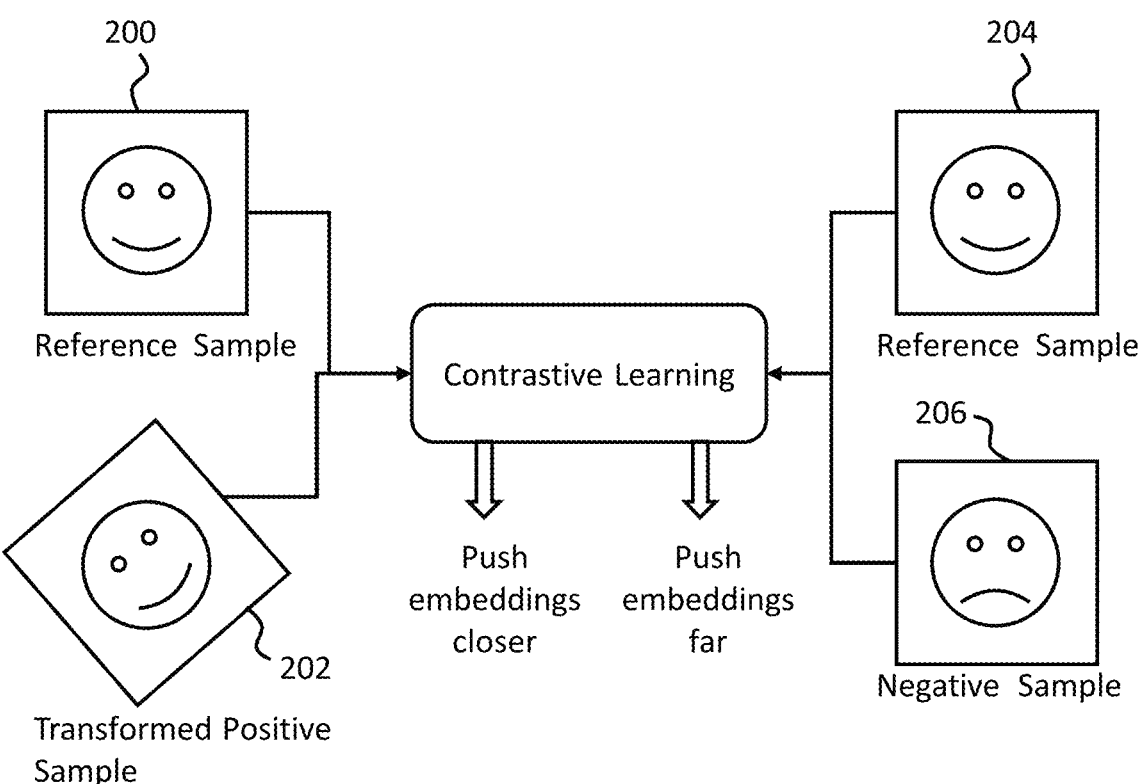
FIG. 2 shows an example of contrastive self-supervised learning.

The following description describes the GSL method that is implemented based on the sensor data. Contrastive learning is used for training, which is a technique that relies upon positive samples, negative samples, and a reference sample. FIG. 2 provides a visual introduction to Contrastive Learning.

Contrastive Learning is a type of self-supervised learning algorithm where the goal is to group similar samples in the dataset closer and dissimilar samples far from each other in the embedding space.

As illustrated in FIG. 2, a reference sample 200, 204 (called an anchor sample) from the training dataset is taken and a pre-defined perturbation (e.g., rotation) is applied to generate a transformed version of the sample, e.g., 202. During the training process, the transformed sample is considered as the positive sample and other randomly selected data samples 206 from the dataset are considered as negative samples.

All three types of data samples (anchor, positive, negative) are fed to a neural network to obtain, e.g., determine, feature embeddings.

The goal of the model training is to bring the feature embeddings of the anchor and positive sample closer, while pushing the embeddings of anchor and negative samples far from each other.

In this process, the model learns to extract good quality feature embeddings just using unlabelled raw data, and these embeddings could be later used for downstream classification tasks.

One of the factors that underpins the performance of the contrastive learning is the choice of a pretext task. A pretext task refers to the perturbation(s) that are applied to each anchor sample for which the designer wants the model to remain invariant, while remaining discriminative to other negative samples.

For example, in FIG. 2, the pretext task is to make the model invariant to rotation 202. The choice of perturbations chosen by the algorithm designer can have a profound impact on the performance of contrastive learning. It has been found that the top-1 accuracy of a model pre-trained with contrastive learning on the ImageNet dataset can drop dramatically from 56.3% (using an image crop and coloring transformation) to just 2.6% (using image rotation transformation).

Therefore, instead of specifying manual transformations (e.g., rotation), which is time consuming task for a developer, during contrastive learning, the present GSL method leverages natural transformations that are already available in sensor datasets, in an automated manner. The TSMDS setting (FIG. 1) presents a unique scenario in which natural transformations are represented by data from different sensors 108A-108D.

In an example implementation, multiple sensors 108A-108D worn by, or otherwise related to a context of the subject user 104 are simultaneously capturing same modality of the same context (e.g., running) from different positions/views with respect to the user. As such, the sets of unlabelled data from different devices 106A-106D can be considered as natural transformations of each other. For example, accelerometer and gyroscope data collected by body-worn sensors depend on the translation and rotation characteristics of the body part where the sensor is placed. Since different body parts have different translation and rotation characteristics (e.g., wrist has a higher rotational degree of freedom than chest), it induces natural transformations in the accelerometer and gyroscope data collected from different body positions.

In summary, the TSMDS setting allows the capture of time-aligned sensor datasets which have natural transformations across them. These natural transformations enable the automatic definition of a pretext task for contrastive learning.

FIG. 3 illustrates a computer-implemented method 300, executable by the apparatus 102. FIG. 3 can be summarised as a method 300 for training a computational model for inferring a time-varying context.

Block 302 comprises obtaining or receiving a plurality of sets of the time-aligned (time series/timestamped sets) unlabelled data, wherein the sets correspond to different ones of the plurality of sensors 108A-108D.

Figure 6:
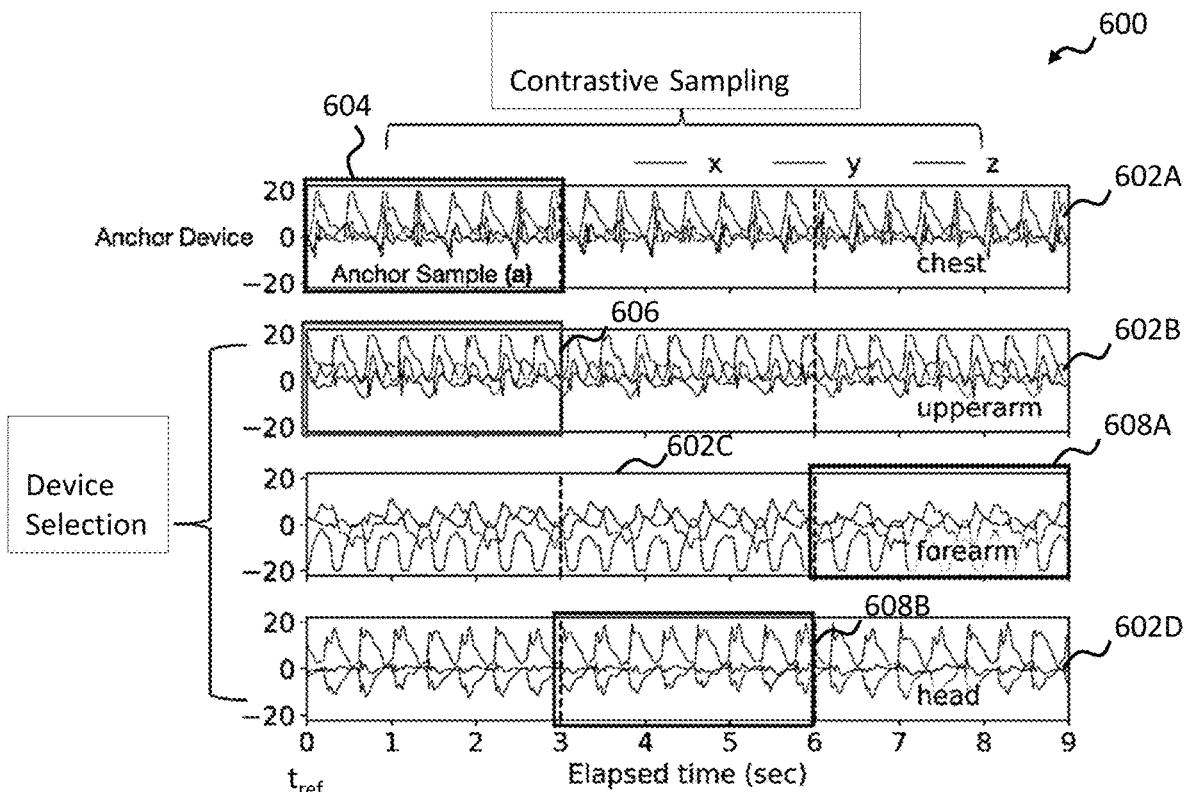
FIG. 6 shows an example of a dataset.

See FIG. 6 for an example of a dataset 600 (plurality of sets) that could be obtained or received by the apparatus 102 from the device(s) of a N plurality of sensors 108A-108D, for example N=4. Without limitation, FIG. 6 relates to human activity recognition based on acceleration data. FIG.

6 illustrates a multi-second trace capturing a persistent context, which in this case is running (but is not labelled as such). The temporal length of the dataset is sufficient to capture a plurality of cycles of the data (steps of the user). In general, the dataset 600 (plurality of sets) may be any data that is time-aligned (time series/timestamped sets) or can be time-aligned by further processing of the data. The specific example in the figure shows a 9-second trace of time-stamped three-dimensional accelerometer data collected simultaneously from N(=4) body-worn devices 106 during a running activity, wherein each accelerometer trace is segmented using a window length of 3 seconds, thereby giving us 3 windows/samples for each device.

In one example, the illustrated dataset 600 comprises four sets of acceleration data 602A, 602B, 602C, 602D, although in other examples there can be as few as two sets of data.

Each set of data comprises motion-dependent data indicating a motion of a different body part of the user to which the sensor is attached. The body parts comprise, for example, the chest, upper arm, forearm and head of the user.

The each set of the data may comprise a plurality of subsets of data corresponding to a same sensing modality, such as motions in different axes. Each illustrated set comprises three-axis accelerometer traces (and/or gyroscope data). Additionally or alternatively, the each set of the data may comprise a plurality of subsets of data corresponding to a same or same type of sensing location, such as a same body part.

The each set of the data is sampled for training purposes, for example, the apparatus 102 may be configured to segment each set of data into substantially non-overlapping time windows for training purposes. In FIG. 6, the time window is three seconds in length, visually separated with dashed vertical lines for clarity. The length of the time window is sufficient to capture a plurality of cycles of the data, and is shorter than the duration of the whole set of data so that the time window can be changed in future iterations of the learning process.

Consider, for example, that a feature extractor is to be trained for the 'chest' body position using contrastive learning. As such, the apparatus 102 is configured to mark the set of data for the 'chest' as the anchor set (e.g. reference set). The first anchor sample 604 (e.g. reference sample) from the 'chest' anchor set is highlighted by a rectangle in FIG. 6 indicating the time window. In an example, one of the devices 106A-106D is selected or defined as an anchor device, and its data set is called as anchor set, and a sample of the data set as an anchor sample. The selection/definition of the anchor device indicates a device, for which a computational model is needed.

Next, at block 304, the method 300 comprises obtaining or receiving information to help the apparatus 102 to determine how to automatically (without user intervention) mark samples from the remaining N-1 sets (i.e., upper arm, forearm, head) as positive samples and negative samples respectively, for contrastive training.

A good positive sample $x^+$ has the following characteristics:

(P1) $x^+$ should belong to the same label/class as the anchor sample x. This is because if $x^+$ and x are from different classes and yet a feature extractor tries to map them closer to each other, it would lead to poor class separation and degrade the downstream classification performance.

(P2) $x^+$ should come from a device/sensor whose data distribution has a small divergence from that of the anchor sample. This is because if the anchor device and positive device are very different in their data characteristics (e.g., wrist-worn inertial measurement unit [IMU] vs. chest-worn IMU), then the feature extractor may find it hard to map their data closer to each other. In other words, a small divergence may be used, because in some examples, if there is no divergence then the data may be of no use for the training.

Note that in GSL, there may not be access to the ground-truth labels of the data. As such, enforcing (P1) on $x^+$ may seem tricky at first. However, based on the implementation of the TSMDS (FIG. 1), it can be inferred that all sensors 108A-108D collect the data simultaneously and in a time-aligned fashion. Hence, it can be naturally assumed that the ground-truth labels (e.g., named as, e.g., walking, running, etc. based on a monitored activity, monitored modality, etc.) are also time-aligned across devices 106A-106D. Therefore, if it can be ensured that x and $x^+$ are time-aligned, it will implicitly guarantee that they have the same labels. The time-alignment is ensured, for example, by a primary reference clock (PRC) that is synchronizing a network where the devices 106A-106D and the apparatus 102 (and the subject 104) are connected.

A good negative sample has the following characteristics:

(N1) $x^-$ should be a true negative, i.e., belong to a different class than the anchor sample x. This is because if x and $x^-$ are from the same class and yet the feature extractor tries to push them away, it could lead to poor classification performance.

(N2) The most informative negative samples are those whose embeddings are initially near to the anchor embeddings, and the feature extractor needs to push them far apart. In this scenario, the feature extractor gets a strong supervisory signal from the data and more useful gradients during training. In the alternate scenario, when negative embeddings are already far apart from anchor when the training initialises, the feature extractor will receive a weaker supervisory signal from the data, which could adversely impact its convergence.

Again, due to the unavailability of class labels in GSL, strictly enforcing (N1) is not possible. A solution is needed which can encourage this characteristic on negative samples, and minimise the possibility of x and $x^-$ belonging to the same class.

Intuitively, there will be some sensors whose data distribution will be too far apart from the data distribution of 'chest'. If the method 300 uses these far-apart devices to obtain, e.g. determine, positive samples and push them closer in the embedding space to the anchor samples, it may lead to degenerate solutions for contrastive learning. Further, as the data distribution of each device changes depending on the user's activity, the method 300 may desirably account for these dynamic changes while selecting devices. This challenge can be referred to as 'Device Selection'.

This Device Selection operation at block 304 comprises obtaining (e.g., determining) statistical separation information indicative of statistical separation of at least portions (e.g., samples) of individual ones of the sets of data from the reference set. For example, a set can be compared with a reference set, or a sample of the set can be compared with a reference sample of the reference set, or the sample of the set can be compared with the reference set, or the set can be compared with the reference sample. As an example, an anchor set of data from the apparatus 102 is used as a reference set, and a first anchor sample 604 from the apparatus 102 is used as a reference sample.

The statistical separation information can comprise a similarity metric or a difference metric. Therefore, the statistical separation information enables a ranking of the data distributions relative to the reference set of data.

In examples, obtaining the statistical separation information comprises obtaining/determining the pairwise Maximum Mean Discrepancy (MMD) of each N-1 set relative to the reference set. MMD is a distribution-level statistic to compute the distance between two data distributions, wherein a higher MMD implies a larger distance between distributions.

Regarding alternatives to MMD, a usable alternative is the Jensen-Shannon divergence metric which has similar accuracy to MMD.

The apparatus 102 may be configured to mark (select/label) the set of data having the greatest statistical similarity (e.g., least MMD distance) to the reference set as a positive set of data (data of a positive device/positive sensor). This satisfies criterion (P2) for selecting good positive samples and ensures that the feature extractor can reasonably map the embeddings of the samples closer to each other.

Optionally, multiple positive sets of data can be marked. For instance, sets of data having a statistical similarity (e.g., MMD distance) below a threshold may be marked as positive. However, some experiments found that using one closest device as positive gave the best performance.

The apparatus 102 may be configured to mark some or all of the remaining sets of data (other than the reference set and positive set) as negative, because their statistical similarity to the reference set is less (e.g., higher MMD distance).

There are at least two approaches for handling of negative sets of data: there may be either a 'hard' threshold or a 'soft' threshold.

In the case of a soft threshold, training weights may be assigned. For the negative sets of data, the apparatus 102 may be configured to assign training weights to the individual negative sets of data. Sets of data with greater statistical similarity (e.g., smaller MMD distance) to the reference set can be assigned higher weights during contrastive training. Sets of data with relatively lower statistical similarity (e.g., higher MMD distance) to the reference set can be assigned relatively lower weights during contrastive training.

By assigning weights, criterion N2 is satisfied and those negative sets of data which are closer to the reference set get more weight during training.

The use of many or 'all' remaining sets of data as negatives serves as a hedge against the scenario when criterion (N1) is violated on one device. For example, even if one device violates (N1) and ends up choosing $x^-$ from the same class as x, the other devices can cover for it, and ensure that its impact on feature extractor is minimal.

In the case of a hard threshold, sets of data with a below-threshold statistical similarity can be ignored (e.g., discarded).

Some testing has found the soft threshold to be more accurate, while also remaining resilient to practical deployment issues such as data/device dropouts (such sets would be given a very low weight so effectively excluded). However, some testing has found that a hard threshold could be advantageous for some specific implementations.

In an implementation, the apparatus 102 receives data from a set D of devices with time-aligned and unlabelled sets of data $$\{X_i\}_{i=1}^D.$$

Let $D^* \in D$ be the anchor device. Let $D^\theta = D \backslash D^*$ be a candidate set of remaining devices from which we want to choose positive and negative devices.

First, we sample a batch of time-aligned data from the anchor device $D^*$ and each of the devices in $D^\theta$. Let x* and $$X^\theta = \{x_i\}_{i=1}^{|D^\theta|}$$

be the data batches from the anchor and the candidate devices, respectively.

The weights assigned to each negative device $i \in D^\theta$ can be expressed as Equation 1:

$$w_i = \frac{1}{MMD(x^*, x_i)} \tag{1}$$

As an example, a Device Selection policy was applied to a RealWorld HAR dataset (a publicly available dataset). The dataset contains sensor data from seven inertial measurement unit-equipped devices: D={chest, upperarm, forearm, thigh, shin, head, waist}. The 'chest' was chosen as the anchor device and obtain, e.g. determine, the pairwise MMDs between data from 'chest' and data from the remaining devices. This results in the following pairwise MMD scores: {chest-head: 0.45, chest-waist: 0.61, chest-thigh: 0.67, chest-upperarm: 0.77, chest-forearm: 0.83, chest-shin: 1.51}. In line with the Device Selection algorithm, the head was chosen as the positive device and {head, waist, thigh, upperarm, forearm, shin} were chosen as the negative devices with weights inversely proportional to their MMD scores.

Block 306 comprises marking a first sample, of a first set of the plurality of sets, as a positive sample. Block 308 comprises marking a second sample, of a second set of the plurality of sets, as a negative sample. It is possible that further samples from third or further sets can be marked as further negative (and/or further positive) samples.

In examples, the first sample(s) is selected from the positive set (positive device) identified based on block 304, and the second samples(s) is/are selected from the negative set(s) (negative device) identified based on block 304.

In examples, the policy for selecting a positive sample from the positive set and negative sample(s) from the negative set(s) is a Contrastive Sampling policy.

Formally, the apparatus 102 is provided with an anchor device (reference device) $D^*$, a set of positive $(D^+)$ and negative $(D^-)$ devices. Let $$P_i = \{p_i^1, \ldots, p_i^T\}|_{i=1}^{|D^+|}, N_j = \{n_j^1, \ldots, n_j^T\}|_{j=1}^{|D^-|}, A = \{a^1, \ldots, a^T\}$$

be the time-aligned data batches from the $i^{th}$ positive, $j^{th}$ negative, and the anchor device respectively. Here, $$p_i^t, n_j^t$$

and $a^t$ each denote a data sample at time-step t.

The objective of contrastive sampling is to select 'good' positive and negative embeddings for a given anchor sample $a^t$. An example sampling policy works based on time-alignment of data to define Synchronous Positive Samples, and Asynchronous Negative Samples.

Synchronous Positive Samples: For a given anchor sample $a^t$ at time-step t, the apparatus 102 chooses its time-aligned positive counterparts $$p_i^t$$

as the positive samples. In other words, a sample window from the positive set of data that starts at substantially the same time as a reference time, the reference time being the time or start time of the anchor sample (reference sample) of the anchor set (reference set). Optionally, the positive sample has substantially the same duration as the reference sample. If there is a small time-lag between the start times of the sample window of the positive data and of the anchor sample, the windows nonetheless may substantially overlap. As explained earlier, this choice ensures that the anchor and positive samples have the same labels, and satisfies the (P1) criteria for good positive samples.

Asynchronous Negative Samples: A criterion for good negative samples (N1) is that they should belong to a different class from the anchor sample. As the apparatus 102 does not have access to ground-truth labels during contrastive learning, it may not be possible to strictly enforce (N1). As a solution, the apparatus 102 is configured to make use of the observation that negative samples which are not time-synchronised with the anchor (reference) sample are more likely to be from a different class. That is, for an anchor (reference) sample $a^t$ at time-step t, a good negative sample would be $n^{t'}|t'\neq t$. In examples, the time window of the negative sample is non-overlapping with respect to the time window of the positive sample and/or of the anchor (reference) sample.

This choice however still does not guarantee that the labels at time-steps t and t' will be different; for example, a user's activity at t=0 and t'=100 may happen to be the same by random chance. To minimise the possibility of such cases, a large batch size can be used during GSL which ensures that each batch has diverse class labels in it and the possibility of a label overlap at t and t' by random chance is reduced.

FIG. 6 illustrates an example of an anchor sample (reference sample) 604, a synchronous positive sample 606, and asynchronous negative samples 608A, 608B.

In some examples, the first sample and the second sample are selected prior to block 304. Block 304 then comprises obtaining, e.g. determining, statistical separation information indicative of statistical separation of the first sample from the reference sample or reference set, and comprises obtaining, e.g. determining, statistical separation information indicative of statistical separation of the second sample from the reference sample or reference set. Blocks 306 and 308 then apply the Contrastive Sampling policy to the first sample and to the second sample.

Finally, block 310 of the method 300 comprises providing the positive sample and the negative sample for training a computational model. The reference sample may further be provided. 'Providing' includes, for example, inputting the samples to a locally-executed training model (feature extractor), or sending the samples to a remotely-executed training model, or storing/outputting the samples for later execution.

Figure 4:
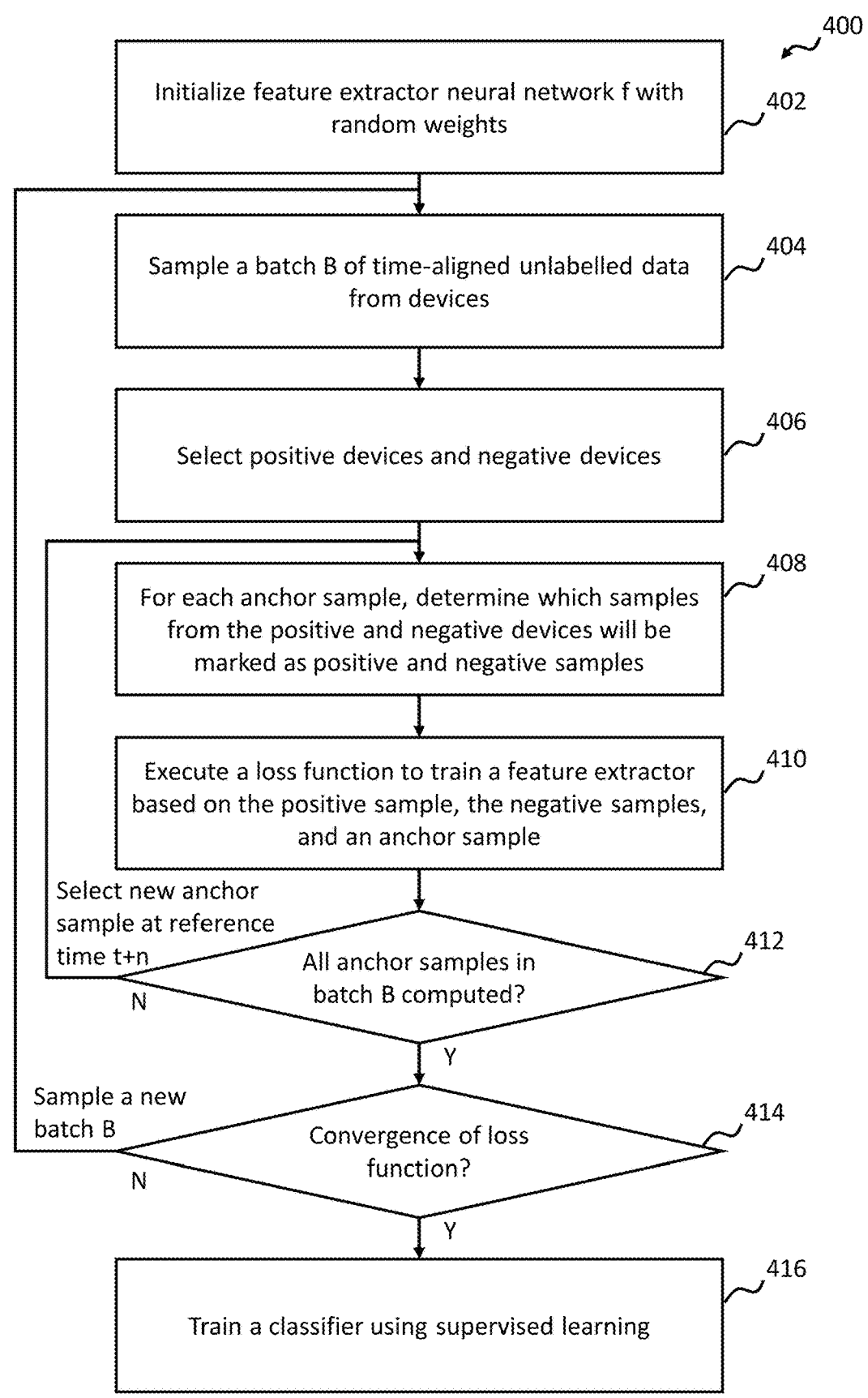
FIG. 4 shows an example of a method.

FIG. 4 illustrates an example of a computer-implemented method 400, which comprises the operations of FIG. 3 and additional, optional operations which train the computational model. The computational model can comprise any neural network, such as artificial neural network (ANN) or deep neural network (DNN). In the case of video or audio data, a recurrent neural network (RNN) or convolutional neural network (CNN) may be appropriate.

Block 402 comprises initialising a feature extractor f, if required. The feature extractor f may be implemented as a neural network, such a convolutional neural network (CNN) or any model of an artificial neural network (ANN). Initialising the feature extractor may comprise providing the feature extractor with random weights. The construction of the neural network can be any that is suitable for a specific task and/or for hardware and software limitations of the device 102.

Block 404 comprises sampling a batch B of time-aligned unlabelled data. This is an implementation of operation 302 of the method 300 of FIG. 3. The unlabelled data comprises timestamp information, enabling the apparatus 102 to time-align the sets of data if this has not already been done. Likewise, the data could be resampled to a common sampling rate, if they are at different rates.

Block 406 comprises selecting positive and negative devices. This is an implementation of operation 304 of the method 300 of FIG. 3. The 'Device Selection' policy described above can be used.

Block 408 comprises, for an anchor sample, determining which samples from the positive and negative devices will be marked as positive and negative samples, and then marking the samples as such. This is an implementation of operations 306 and 308 of the method 300 of FIG. 3. The 'Contrastive Sampling' policy can be used.

Blocks 410 to 416 relate to the training process itself. Block 410 comprises executing, e.g. calculating, a loss function to train the feature extractor f based on the positive sample(s), the negative sample(s), and the anchor sample.

An explanation is provided below of how the positive and negative samples selected from the previous operation can be used to train the feature extractor f. Firstly, the anchor sample, positive samples(s) and negative samples are fed to the feature extractor to obtain, e.g. determine, feature embeddings. Let $$\{z_i^+\}|_{i=1}^{|D^+|} \quad \text{and} \quad \{z_j^-\}|_{j=1}^{|D^-|}$$

be the selected feature embeddings from the $i^{th}$ positive and $j^{th}$ negative device. Let $z^*$ be the anchor embedding.

A novel loss function (2) called Group Contrastive Loss is proposed for computing a loss value, which is adapted to be compatible with multiple positive samples and/or multiple negative samples:

$$L_{GCL} = -\log \frac{\sum_{i=0}^{|D^+|}\exp\left(\frac{\text{sim}(z^*, z_i^+)}{\tau}\right)}{\left(\sum_{i=0}^{|D^+|}\exp\left(\frac{\text{sim}(z^*, z_i^+)}{\tau}\right) + \sum_{j=0}^{|D^-|}w_j\exp\left(\frac{\text{sim}(z^*, z_j^-)}{\tau}\right)\right)} \quad (2)$$

where sim($\cdot$) denotes cosine similarity, $w_j$ is the weight assigned to the negative device by Equation (1), and $\tau$ is a hyperparameter denoting temperature.

In examples, $L_{GCL}$ is minimised for each batch of data using stochastic gradient descent. Effectively, the loss minimisation during training guides the feature extractor f($\cdot$) to increase the cosine similarity between anchor and positive embeddings (i.e., push them closer in the feature space), and do the opposite for anchor and negative embeddings. In doing so, f(·) understands the structure of the sensor data from different devices, and learns to map raw data into good quality feature representations, which can be useful for various downstream classification tasks.

In other examples, a different function can be used than that shown in Equation (2). For example, a Triplet Loss function may be adapted to be compatible with multiple positive samples and/or multiple negative samples.

Decision blocks 412 and 414 and their associated iteration loops enable the method 400 to provide further positive samples and further negative samples and further anchor samples based on different reference times (time step #t), and determining the loss value iteratively, based on the further samples, until a convergence criterion is satisfied.

At decision block 412, the method 400 comprises determining whether enough (e.g., all) samples in batch B have been computed. If not, the method 400 selects a new anchor sample at reference time t+n and loops to block 408 to select positive and negative samples based on the new anchor sample.

Once enough samples in batch B have been computed, block 412 is satisfied and the method 400 proceeds to decision block 414.

At decision block 414, the method 400 comprises determining whether a convergence criterion for the loss function is satisfied. Upon convergence, we expect that the feature extractor f has learned to extract high-quality feature representations for the computational model.

The convergence criterion can comprise, for example, a requirement that the loss value computed by the loss function has not changed (e.g., remained within a range) over N batches. Then, it can be said that the training has converged. Alternatively, or additionally, the convergence criterion can comprise a requirement to stop the training in dependence on detection of a minima (e.g., detection of the loss value starting to increase after a period of decreasing). In some other or alternative example, the convergence criterion can comprise, for example, a requirement that the loss value computed by the loss function has reached a certain threshold level, that can be set by a system administrator.

If convergence is not yet reached, the method 400 loops to block 404 to obtain or receive a new batch B (dataset) of sets of time-aligned unlabelled data.

After convergence is reached, the method 400 may optionally comprise a supervised fine-tuning block 416, comprising training a classifier, connected to the feature extractor, on a small labelled dataset from the anchor device with which the computational model is associated. The anchor device is the same anchor device that provided the anchor set (reference set). In some examples, the small labelled dataset can be labelled by a user or an administrator of the method 10, a user of the anchor device. In some examples, the small labelled dataset can be labelled based on a sensor modality of related dataset, for example, and/or based on a subject 104, for example, movement (modality), acceleration (modality), arm (subject), movement (modality) of arm (subject), acceleration (modality) of arm (subject), etc.

In an example implementation, block 416 comprises freezing the weights of the feature extractor except its last convolution layer and adding a classification head to the computational model.

The classification head comprises a fully connected layer of a plurality of hidden units. For example 1024, with one or more activation functions (such as rectified linear units (ReLU) or the like), followed by an output layer with the number of units equal to the number of labels. The computational model is then trained with a small labelled dataset L* from the anchor device by optimising a loss function such as Categorical Cross Entropy loss function or the like.

This optional supervised fine-tuning operation may be implemented by the apparatus 102 causing an output device (e.g., of the anchor device) to prompt a user to add labels.

In a real-life deployment, sometimes a supervised fine-tuning is done because real deployments would expect classifications. However, it is not essential in order for the computational model to work.

Optionally, in some examples, the method 400 can comprise initially training a classifier based on a small labelled dataset. The unlabelled sets of data may then be passed to the classifier to generate pseudo labels. This enables the method 400 at operation 408 to mark positive samples and negative samples further in dependence on whether the pseudo labels are the same or different. It would still be a requirement for the negative samples to be asynchronous (non time-aligned), in addition to the pseudo label check. This feature would further improve accuracy.

FIG. 5 illustrates an example computer-implemented method 500 that may be carried out at an anchor device 106, for example, 106A of the system 100. This enables an anchor device 106 to request its own trained computational model from the apparatus 102. When the system 100 comprises multiple devices 106A-106D, some or all devices may be capable of being an anchor device and capable of requesting its own trained computational model from the apparatus 102.

An advantage of each device 106A-106D being given its own trained computational model is robustness against sensor loss. For example, when a user goes running, they may not always decide to wear all the devices that were used for training the computational model. Therefore, they may want at least some devices to have their own trained/finetuned computational models. In some examples, a device 106A has a computational model, that is trained by a device manufacturer and/or a model provider to a certain level of accuracy, that the user (e.g. an object 104) can then further train to better match user's personal features and to provide more accurate inference results.

The method 500 comprises, at block 502, determining that a condition indicating a requirement for training is satisfied. For example, the condition may be time-dependent (e.g. retrain the model every 24 h), based on trigger word detection, based on industrial process monitoring feedback (e.g. process accuracy or some process function value has shifted below a threshold value, wherein a new model training is needed), based on a specific command/input from the user via a user interface of the device 106, etc.

The method 500 comprises, at block 504, sending data of a sensor(s) 108 associated with the device 106 to the apparatus 102, the data defining the reference set (i.e. anchor set). The data may be already defined as a reference set by a user of the device 106, or the apparatus 102 may define the data as a reference set after it is received. Additionally or alternatively, an indication and/or information of a computational model is sent, the indication and/or information describing the model that is currently implemented in the device 106A or an indication and/or information of a specific model that is requested to be trained for the device 106A. Additionally or alternatively, the current model, as such, can be sent to the apparatus 12. Further, in some other or additional examples, the anchor device 106 can obtain, e.g. determine, a modality of the reference set, and send an indication and/or information on the modality to the apparatus 102 for the training of a relevant computational model.

Further, the training of the computational model is executed by the apparatus 102 according to the methods 300 or 400.

Once the apparatus 102 has trained the computational model (methods 300/400) in response, the method 500 comprises, at block 506, the device 106 receiving from the apparatus 102 the computational model, trained based on the sent reference set and the sets of time-aligned unlabelled data from other sensors of other device(s). In some examples, the computational model is additionally also trained by the modality of the reference set. Wherein in some examples the modality of the reference set comprises one or more of one or more measured physical attributes, features or properties relating to an input used by a specific sensor, or one or more attributes, features or properties relating to a subject 104. Further in some other or additional examples, the other sensors are related, e.g. connected, to the subject 104.

Block 508 comprises the runtime operation of determining an inference based on applying new data from the sensor to the trained computational model. Unlike the training process, this operation does not necessarily require high computational resources.

In another implementation, the trained computational model remains on the apparatus 102 or another entity, but it is nonetheless associated with the specific device 106. That is, the device 106 can send requests to the remotely-hosted trained computational model and receive inferenced output data in response.

Block 510 can then comprise controlling one or more functions of the device 106 and/or the object 104, and/or rendering related information via a user interface of the device 106 and/or the object 104, based on the inference result. For example, the function may be an industrial control function for an object 104 and/or the device 106A, among other things. In case of a human activity recognition, controlling, for example, the user (e.g. object 104) by giving exercise instructions/recommendations.

In some examples, the device 106A is itself the apparatus 102. In some alternative or additional examples, the device 106A itself is the subject 104. In some alternative or additional examples, the device 106A, the subject 104 and apparatus 102 are a same device.

Figure 7:
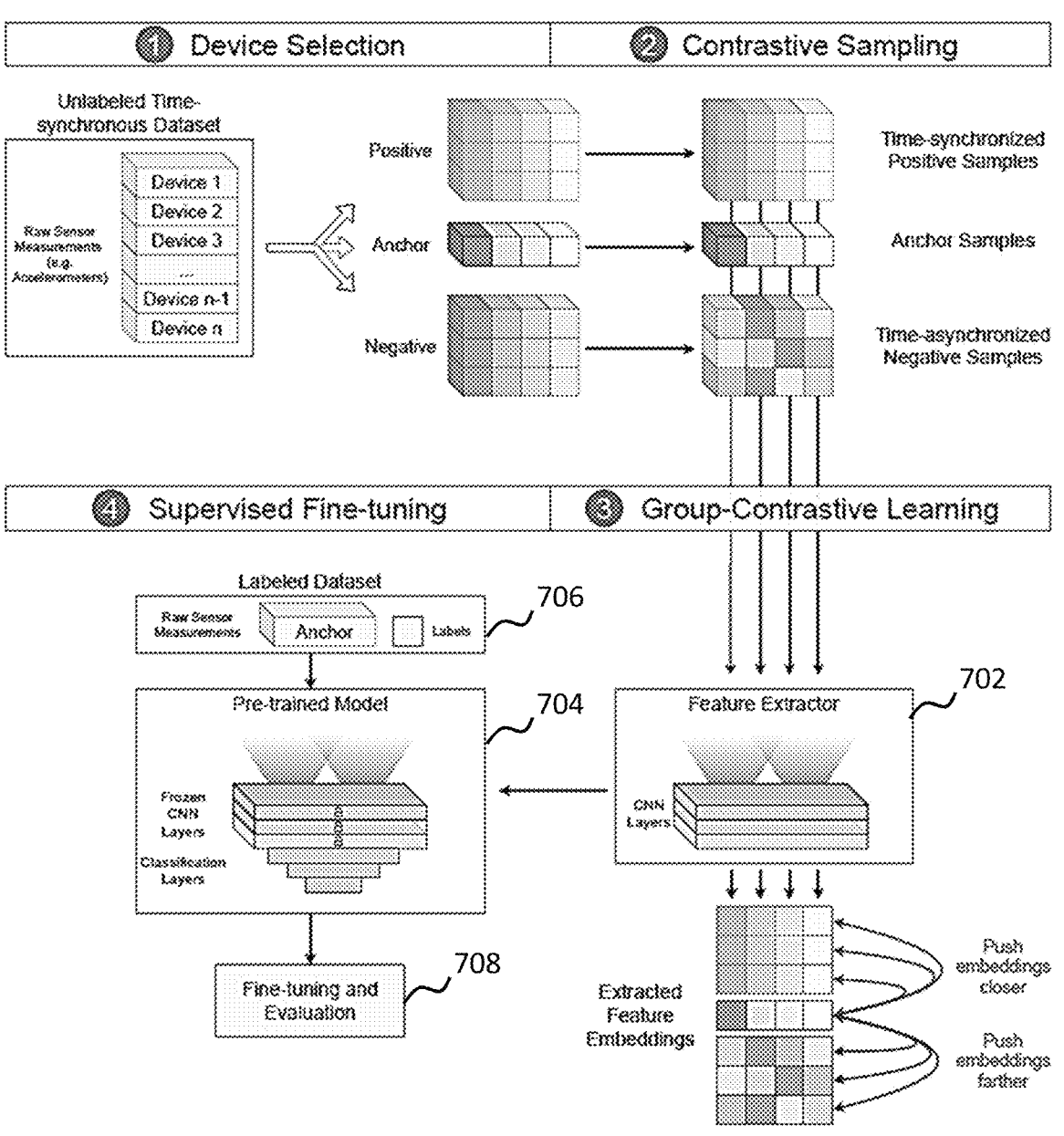
FIG. 7 shows an example of data flow in group supervised learning.

FIG. 7 illustrates an example of data flow (from block 1 to block 4) in the group supervised learning methods described herein.

Block 1 of FIG. 7 represents Device Selection. A dataset 600 is visually represented, which is split into positive, anchor (reference) and negative sets of data 602A-602N.

Block 2 of FIG. 7 represents Contrastive Sampling. Synchronous positive samples, anchor (reference) samples, and time-asynchronised negative samples are marked.

Block 3 of FIG. 7 represents Group Contrastive Learning, wherein the loss function of a feature extractor 702 is applied to push embeddings closer or further to/from the anchor (reference) samples.

Block 4 of FIG. 7 represents Supervised Fine-Tuning. A small labelled dataset 706 from the anchor device is provided to fine-tune the computational model 704, comprising a pre-trained feature extractor 702. In some examples, the pre-trained feature extractor 702 comprises frozen layers (e.g., CNN layers with frozen weights) and classification layers. The computational model 704 is connected to a fine-tuning and evaluation block 708 to make supervised learning (e.g., fine-tuning and evaluation circuitry) for performing operation 416 of the method 400.

Figure 8:
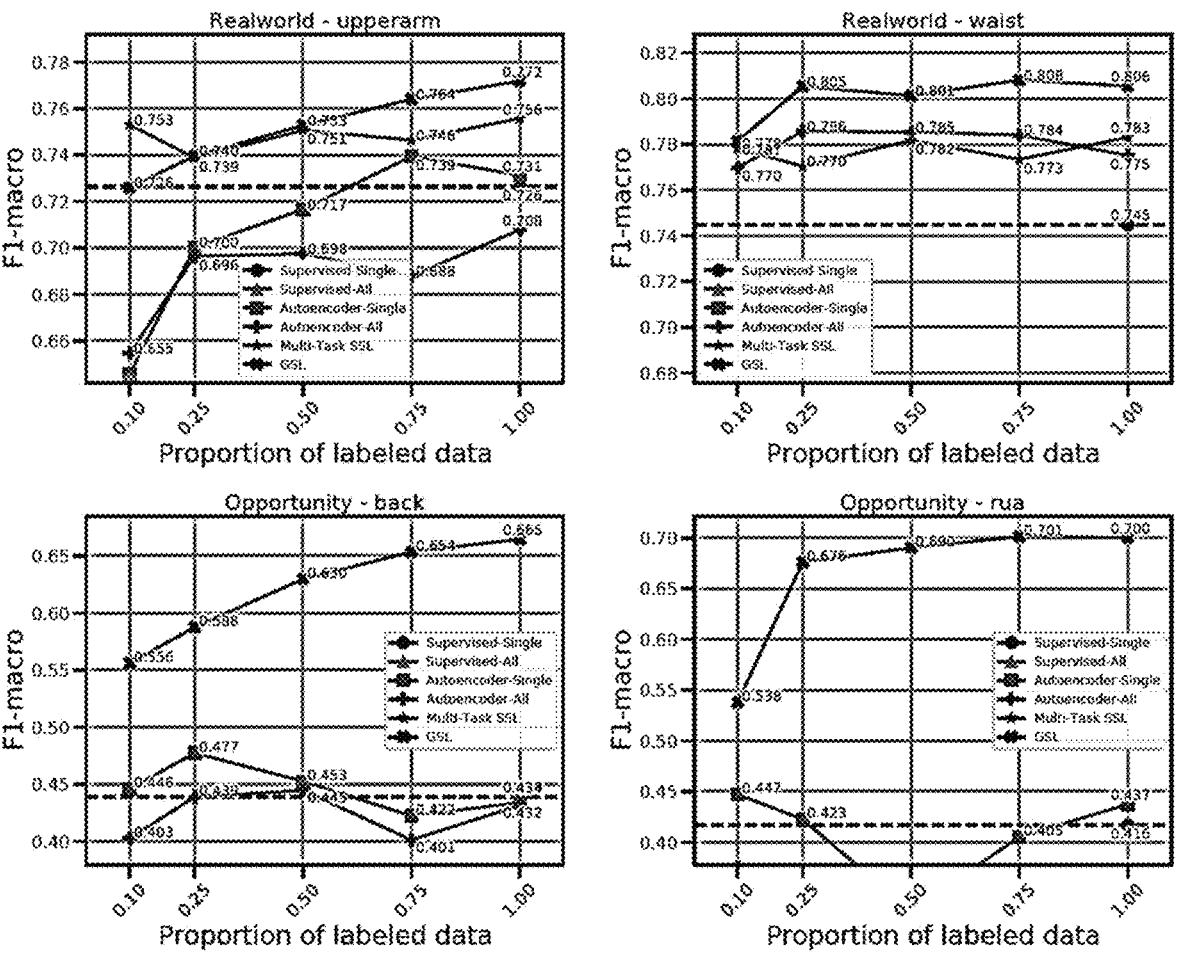
FIG. 8 shows an example of comparative Macro $F_1$ scores.

FIGS. 8-9B provide comparative examples, to demonstrate that the methods 300, 400 provide a consistent and repeatable accuracy improvement over methods for automatically preparing and implementing training datasets, without being too computationally-heavy at runtime.

GSL was evaluated on three multi-device HAR datasets, and its performance was compared against various HAR baselines such as self-supervised learning, semi-supervised learning and fully-supervised learning. Key results include:

GSL outperforms the fully-supervised learning in a low-data regime. In 13 out of the 15 anchor (reference) devices; GSL trained with 10% or 25% of the labelled data achieves a higher $F_1$ score than the fully-supervised model trained with 100% labelled data ($F_1$ score is the harmonic mean of the precision and recal, also the $F_1$ score is also known as the Sorensen-Dice coefficient or Dice similarity coefficient (DSC)).

GSL also outperforms various HAR baselines in terms of recognition performance. When the same amount of labelled data is used, GSL has an absolute increase of 7% in the $F_1$ score, compared to the best performing baseline.

Through visualisation of t-SNE plots (FIGS. 9A-9B) and saliency maps, it is shown that GSL generates well-separable and meaningful feature embeddings across classes.

GSL is robust to temporal misalignment of data from multiple devices; less than 0.006 difference in the $F_1$ score is observed when up to 500 ms of time synchronisation error is introduced in devices.

For the experiments, three datasets for human activity recognition (HAR) were used, which have time aligned sensor data from multiple devices: RealWorld, Opportunity, and PAMAP2, as shown in Table 1 below. In common, they contain 3-axis accelerometer and 3-axis gyroscope data sampled simultaneously from multiple on-body devices. The datasets are from:

RealWorld HAR dataset—Timo Sztyler and Heiner Stuckenschmidt. 2016. On-body localization of wearable devices: An investigation of position-aware activity recognition. In 2016 IEEE International Conference on Pervasive Computing and Communications (PerCom). IEEE, 1-9;

Opportunity—Daniel Roggen, Alberto Calatroni, Mirco Rossi, Thomas Holleczek, Kilian Förster, Gerhard Tröster, Paul Lukowicz, David Bannach, Gerald Pirkl, Alois Ferscha, et al. 2010. Collecting complex activity datasets in highly rich networked sensor environments. In 2010 Seventh international conference on networked sensing systems (INSS). IEEE, 233-240.; and PAMAP2—Attila Reiss and Didier Stricker. 2012. Introducing a new benchmarked dataset for activity monitoring. In 2012 16th international symposium on wearable computers. IEEE, 108-109.

TABLE 1

Summary of datasets used for evaluation

| Dataset | No. of devices (positions) | No. of users | No. of activities (labels) |
|---|---|---|---|
| RealWorld | 7 (forearm, thigh, head, upper arm, waist, chest, shin) | 15 | 8 (stair up, stair down, jumping, lying, standing, sitting, running, walking) |

TABLE 1-continued

| Summary of datasets used for evaluation | | | |
| --- | --- | --- | --- |
| Dataset | No. of devices (positions) | No. of users | No. of activities (labels) |
| Opportunity | 5 (back, left lower arm, right shoe, right upper arm, left shoe) | 4 | 4 (standing, walking, sitting, lying) |
| PAMAP2 | 3 (arm, chest, ankle) | 8 | 4 (standing, walking, sitting, lying) |

The RealWorld dataset contains accelerometer and gyroscope traces of 15 participants, sampled at 50 Hz simultaneously on 7 sensor devices mounted at forearm, thigh, head, upper arm, waist, chest, and shin. Each participant performed 8 activities: climbing stairs down and up, jumping, lying, standing, sitting, running/jogging, and walking.

The Opportunity dataset contains IMU data collected from 4 participants performing activities of daily living with 17 on-body sensor devices, sampled at 30 Hz. For the evaluation, five devices were selected. The five devices were deployed on the back, left lower arm, right shoe, right upper arm, and left shoe. This evaluation targeted to detect the mode of locomotion classes, namely standing, walking, sitting, and lying.

The PAMAP2 Physical Activity Monitoring dataset contains data of 18 different physical activities, performed by 9 participants with 3 IMUs. The IMUs were deployed over the wrist on the dominant arm, on the chest, and on the dominant side's ankle with a sampling rate of 100 Hz. Out of 9 participants and 18 activities, this evaluation chose 8 participants and four locomotion activities, standing, walking, sitting, and lying, which were shared across all the selected participants.

Baselines: this evaluation compares GSL against 6 baselines, divided in the following 4 categories:

Random: In the Random baseline, this evaluation assigns random weights to the feature extractor and freezes them. During the supervised fine-tuning, only the classification head is trained using labelled data from the anchor (reference) device. This baseline is used to confirm that the learning task is not so trivial that it can be solved with a random feature extractor.

Supervised: To represent traditional supervised learning, this evaluation devises two baselines, Supervised-single and Supervised-all. In both baselines, the feature extractor and classifier are jointly trained using labelled data by optimising a cross entropy loss. In Supervised-single, a separate model is trained on the labelled data of each anchor (reference) device. On the other hand, Supervised-all trains a common model using labelled data from all devices present in the dataset.

Semi-supervised: As an example of semi-supervised learning, this evaluation uses two AutoEncoder baselines: AutoEncoder-single and AutoEncoder-all. In both these baselines, the feature extractor acts as an 'encoder' that converts unlabelled input samples into feature embeddings. This evaluation adds a separate 'decoder' neural network which does the inverse task, i.e., it tries to map the feature embeddings back to the input samples. The encoder and decoder together form the AutoEncoder (AE) and are trained by minimising the MeanSquaredError between the input data and the reconstructed data. In AutoEncoder-single, a separate AE is trained for each anchor (reference) device, where in AutoEncoder-all, a common AE is trained using data from all devices. After the AE training converges, this evaluation discards the decoder and uses the trained encoder as the feature extractor $f(\cdot)$. Subsequently, $f(\cdot)$ is fine-tuned on the labelled data from the anchor (reference) device.

Self-supervised: To compare the performance of GSL with a self-supervised learning (SSL) technique, this evaluation adopts a Multi-task SSL technique. Multi-task SSL learns a multi-task temporal convolutional network with unlabelled data for transformation recognition as a pretext task and fine-tunes the recognition model with a small labelled dataset. In this baseline, a separate HAR model is trained for each anchor (reference) device. Please note that although there are other SSL techniques proposed for HAR, this one is chosen as a baseline, because it also applies transformations to the sensor data values, thus making it a fairer comparison against GSL.

Data pre-processing and hyperparameters: The accelerometer and gyroscope traces are segmented into time windows of 3 seconds for RealWorld and 2 seconds for Opportunity and PAMAP2 datasets without any overlap. Finally, the dataset was normalised to be in the range of −1 and 1.

The training setup of this evaluation is implemented in TensorFlow 2.0. This evaluation used the TF HParams API for hyperparameter tuning and arrived at the following training hyperparameters: {GSL learning rate: 1 e-5, fine-tuning and supervised learning rate: 1 e-3, $\tau$=0.05, batch size=512}.

Evaluation Protocol and Metrics: In GSL, even though this evaluation uses unlabelled data from multiple devices to train the feature extractor, this evaluation is always done on a single anchor (reference) device (e.g., chest-worn IMU for RealWorld). This evaluation divides the participants into multiple groups and conducts leave-one-group-out cross-validation. The number of groups of RealWorld, Opportunity, and PAMAP2 is set to 5, 4, and 4, respectively. More specifically, this evaluation trains the feature extractor using unlabelled data from all groups except a held-out group. Thereafter, the feature extractor along with the classification head is fine-tuned on a labelled dataset from the anchor (reference) device. Finally, the fine-tuned model is tested on the data from the held-out group.

This evaluation uses the macro F1 score (unweighted mean of F1 scores over all classes) as a performance metric, which is considered a reasonable evaluation strategy for imbalanced datasets.

This evaluation focuses on the HAR performance of GSL against baseline techniques in two aspects. First, this evaluation studies whether the solution performs on-par compared to the baselines in a low-data regime, i.e., whether GSL shows comparable performance even with a small amount of labelled data. Second, this evaluation investigates whether the solution outperforms the baselines in terms of the recognition accuracy, with the same data availability, i.e., when all baselines are trained with the same amount of labelled data.

To study the low-data regime, this evaluation fine-tuned GSL and other baselines except Supervised-single, using 10%, 25%, 50%, 75%, and 100% of the available labelled data from the anchor (reference) device. The fine-tuned models are then evaluated on the anchor (reference) device from the validation/held-out group. Supervised-single is used as a reference point, thus trained using 100% of the training data. The labelled training data available in the datasets of this evaluation for each anchor (reference) device (on average) is as follows: RealWorld: 1027 windowed samples (approximately 51 minutes), Opportunity: 3014 samples (approximately 100 minutes), and PAMAP2: 1280 samples (approximately 42 minutes).

Table 2 below shows the classification performance for the various anchor (reference) devices, averaged over all validation groups in a leave-one-group-out evaluation. More specifically, Table 2 reports the minimum percentage of labelled data required by each technique to surpass the performance of Supervised-single (in parenthesis), and the corresponding macro-F1 score averaged over all validation groups. In case a technique does not surpass the performance of Supervised-single, its best performing F1 score and labelled data percentage is reported.

better compared with other semi-supervised approaches (AutoEncoder-single and AutoEncoder-all) and self-supervised approach (Multi-task SSL). More specifically, in 11 out of 15 anchor (reference) devices, GSL used the lowest percentage of labelled data across the baselines. This is remarkable considering that AutoEncoder-single, AutoEncoder-all, and Multi-task SSL win at 3, 4, and 6 anchor (reference) devices; note that multiple winners can be chosen.

Finally, Table 2 shows (in bold font) the technique which provides the highest performance in a low-data regime. Here GSL has the highest F1 score in 10 out of 15 anchor (reference) devices across all techniques.

TABLE 2

Classification performance: average of macro F1 scores and the minimum percentage of labelled data outperforming the fully supervised model (Supervised-single). For each anchor (reference) device, bold numbers represent the highest F1 score, and italic numbers represent the lowest amount of data used by each technique to outperform Supervised-single. When a technique does not perform Supervised-single, its best-achieved performance is denoted with an asterisk.

| Dataset (anchor) | Supervised-single | Random | Supervised-all | Auto Encoder-single | AutoEncoder-all | Multi-task SSL | GSL |
|---|---|---|---|---|---|---|---|
| | | | | RealWorld | | | |
| forearm | 0.732 (100%) | 0.253 (50%)* | 0.495 (100%) * | 0.723 (100%)* | 0.739 (75%) | 0.734 (50%) | 0.767 (25%) |
| head | 0.643 (100%) | 0.211 (25%)* | 0.537 (100%)* | 0.647 (100%) | 0.646 (25%) | 0.670 (25%) | 0.690 (10%) |
| shin | 0.781 (100%) | 0.375 (100%)* | 0.628 (100%)* | 0.784 (10%) | 0.765 (75%)* | 0.81 (10%) | 0.81 (10%) |
| chest | 0.715 (100%) | 0.228 (50%)* | 0.650 (100%)* | 0.478 (75%)* | 0.720 (25%) | 0.722 (10%) | 0.716 (25%) |
| thigh | 0.701 (100%) | 0.283 (100%)* | 0.586 (100%)* | 0.695 (75%)* | 0.656 (25%)* | 0.675 (75%)* | 0.690 (25%)* |
| upper arm | 0.726 (100%) | 0.268 (75%)* | 0.595 (100%)* | 0.739 (75%) | 0.708 (100%)* | 0.753 (10%) | 0.740 (25%) |
| waist | 0.745 (100%) | 0.297 (25%)* | 0.674 (100%)* | 0.582 (75%)* | 0.770 (10%) | 0.778 (10%) | 0.781 (10%) |
| | | | | Opportunity | | | |
| back | 0.439 (100%) | 0.164 (50%)* | 0.253 (25%)* | 0.446 (10%) | 0.445 (50%) | 0.380 (25%)* | 0.556 (10%) |
| lla | 0.370 (100%) | 0.197 (100%)* | 0.398 (25%) | 0.386 (25%) | 0.375 (25%) | 0.374 (100%) | 0.516 (10%) |
| left shoe | 0.391 (100%) | 0.164 (10%)* | 0.396 (75%) | 0.282 (100%)* | 0.172 (25%)* | 0.164 (100%)* | 0.416 (25%) |
| right shoe | 0.378 (100%) | 0.164 (10%)* | 0.392 (25%) | 0.265 (100%)* | 0.166 (50%)* | 0.183 (100%)* | 0.402 (10%) |
| rua | 0.416 (100%) | 0.164 (10%)* | 0.293 (100%)* | 0.447 (10%) | 0.375 (10%)* | 0.277 (10%)* | 0.538 (10%) |
| | | | | PAMAP2 | | | |
| ankle | 0.731 (100%) | 0.618 (50%)* | 0.589 (10%)* | 0.651 (10%)* | 0.770 (10%) | 0.774 (50%) | 0.784 (100%) |
| chest | 0.654 (100%) | 0.376 (50%)* | 0.738 (10%) | 0.669 (75%) | 0.655 (10%) | 0.730 (10%) | 0.741 (10%) |
| hand | 0.723 (100%) | 0.466 (25%)* | 0.731 (25%) | 0.723 (100%) | 0.750 (10%) | 0.791 (10%) | 0.740 (10%) |

The Table 2 results confirm the data-efficiency of GSL. In 13 out of the 15 anchor (reference) devices, GSL with 10% or 25% of labelled data achieves higher F1 score than Supervised-single trained with 100% labelled data. In the remaining two cases, GSL shows comparable F1 score with 25% of labelled data when evaluated at the chest-worn device in RealWorld (GSL: 0.690, Supervised-single: 0.701), and a higher F1 score with 100% of labelled data when evaluated at the ankle-worn device in PAMAP2 (GSL: 0.784, Supervised-single: 0.731).

Table 2 also shows (in italics) the technique which requires the least amount of labelled data to surpass Supervised-single. It is observed that GSL generally performs FIG. 8 provides further insights into these findings by plotting the performance of various techniques when trained or fine-tuned with different percentages of labelled data from the anchor (reference) device. FIG. 8 presents two important findings. First, regardless of the percentage of labelled data used for fine-tuning, GSL generally outperforms the baselines. This shows that the GSL design contributes to enhancing the performance of HAR. Second, it can be observed that GSL outperforms the fully-supervised model (Supervised-single) even with much less labelled data.

Table 3 below shows the mean and standard deviation of macro F1 scores for different anchor (reference) devices. On average, the results show that GSL outperforms baseline techniques for all datasets we used. GSL has an absolute increase of around 7% in the F1 score over the average of all anchor (reference) devices across all datasets, compared to the best performing baseline, Supervised-single. It is also observed that GSL outperforms Multi-task SSL. This validates the choice of leveraging natural transformations from the TSMDS settings for self-supervised contrastive learning.

a 2D space in the following settings: GSL w/o finetuning, GSL w/finetuning, and fully-supervised.

FIGS. 9A and 9B show the t-SNE plots for two positions from the RealWorld and PAMAP2 datasets (publicly available datasets). E.g., FIG. 9A compares the feature embeddings from a user's ankle-worn IMU across the three training settings. FIG. 9B compares the feature embeddings from

TABLE 3

Comparison of classification performance (average and standard deviation of macro F1 scores) for different anchor (reference) devices, when 100% of the labelled data is available for fine-tuning. lla: left lower arm, rua: right upper arm.

| Dataset (anchor) | Supervised-single | Random | Supervised-all | AutoEncoder-single | AutoEncoder-all | Multi-task SSL | GSL |
|---|---|---|---|---|---|---|---|
| RealWorld | | | | | | | |
| forearm | 0.248 (0.028) | 0.732 (0.065) | 0.495 (0.039) | 0.723 (0.045) | 0.718 (0.064) | 0.738 (0.057) | 0.774 (0.053) |
| head | 0.123 (0.028) | 0.643 (0.055) | 0.537 (0.031) | 0.647 (0.071) | 0.627 (0.061) | 0.663 (0.026) | 0.730 (0.046) |
| shin | 0.375 (0.045) | 0.781 (0.044) | 0.628 (0.060) | 0.799 (0.064) | 0.761 (0.078) | 0.785 (0.052) | 0.806 (0.103) |
| chest | 0.135 (0.030) | 0.715 (0.104) | 0.650 (0.054) | 0.461 (0.127) | 0.729 (0.09) | 0.708 (0.061) | 0.720 (0.095) |
| thigh | 0.283 (0.024) | 0.701 (0.11) | 0.586 (0.022) | 0.670 (0.061) | 0.616 (0.088) | 0.651 (0.120) | 0.679 (0.101) |
| upper arm | 0.126 (0.028) | 0.726 (0.090) | 0.595 (0.019) | 0.731 (0.066) | 0.708 (0.063) | 0.756 (0.084) | 0.772 (0.042) |
| waist | 0.157 (0.049) | 0.745 (0.127) | 0.674 (0.042) | 0.579 (0.167) | 0.775 (0.051) | 0.783 (0.102) | 0.806 (0.070) |
| Average | 0.207 (0.096) | 0.720 (0.099) | 0.595 (0.071) | 0.659 (0.140) | 0.705 (0.093) | 0.726 (0.093) | 0.755 (0.089) |
| Opportunity | | | | | | | |
| back | 0.164 (0.010) | 0.439 (0.092) | 0.217 (0.012) | 0.434 (0.114) | 0.432 (0.107) | 0.355 (0.076) | 0.665 (0.134) |
| lla | 0.197 (0.050) | 0.370 (0.013) | 0.396 (0.082) | 0.458 (0.028) | 0.369 (0.016) | 0.374 (0.011) | 0.553 (0.018) |
| left shoe | 0.164 (0.009) | 0.391 (0.043) | 0.394 (0.046) | 0.282 (0.073) | 0.171 (0.010) | 0.164 (0.009) | 0.443 (0.040) |
| right shoe | 0.164 (0.009) | 0.378 (0.024) | 0.354 (0.032) | 0.265 (0.056) | 0.164 (0.009) | 0.183 (0.011) | 0.448 (0.026) |
| rua | 0.164 (0.009) | 0.416 (0.060) | 0.293 (0.068) | 0.437 (0.126) | 0.277 (0.058) | 0.185 (0.034) | 0.700 (0.131) |
| Average | 0.171 (0.027) | 0.399 (0.060) | 0.331 (0.087) | 0.375 (0.121) | 0.283 (0.119) | 0.252 (0.100) | 0.562 (0.137) |
| PAMAP2 | | | | | | | |
| ankle | 0.563 (0.109) | 0.731 (0.100) | 0.558 (0.072) | 0.635 (0.012) | 0.754 (0.081) | 0.720 (0.095) | 0.784 (0.088) |
| chest | 0.133 (0.012) | 0.654 (0.136) | 0.680 (0.082) | 0.687 (0.120) | 0.639 (0.098) | 0.716 (0.141) | 0.742 (0.112) |
| hand | 0.383 (0.127) | 0.723 (0.111) | 0.738 (0.092) | 0.723 (0.105) | 0.729 (0.088) | 0.777 (0.065) | 0.737 (0.078) |
| Average | 0.359 (0.201) | 0.703 (0.121) | 0.659 (0.111) | 0.682 (0.099) | 0.708 (0.102) | 0.738 (0.109) | 0.754 (0.097) |
| Total Average | 0.246 | 0.607 | 0.528 | 0.572 | 0.565 | 0.572 | 0.69 |

FIGS. 9A and 9B show example comparative t-SNE visualisations. This evaluation visualises the learned feature embeddings of GSL and a fully supervised model (Supervised-single) using t-distributed stochastic neighbor embedding (t-SNE) plots.

t-SNE is a statistical method that is used to explore and visualise high-dimensional data. Based on Stochastic Neighbor Embedding, it reduces the dimensionality of data in a nonlinear way and places each data point in a location in a space of two or three dimensions. Specifically, t-SNE aims to discover patterns in the data by clustering data points based on their similarity.

Using t-SNE, this evaluation projects the 96-dimensional feature embeddings generated by the feature extractor onto a user's hand-worn IMU across three training settings. In common, GSL w/o finetuning already generates well-separable feature embeddings across classes. It implies that the group contrastive learning in the TSMDS setting is able to capture the semantic structure of the data very well. The class separation in the embeddings is further improved by finetuning with a small amount of labelled data as shown in GSL w/finetuning. It is also observed that the clusters learned with GSL are largely comparable with those learned with fully-supervised model trained with 100% of the labelled data. Note that the activity labels are not used for t-SNE computation, but only for visualisation.

Earlier it is assumed that data from multiple devices in the TSMDS arrangement are collected in a time aligned manner.

To investigate how robust GSL is to temporal misalignment between devices, an experiment was conducted with the RealWorld dataset by deliberately injecting time synchronisation errors. More specifically, the experiment shifted the timestamps of all devices in the RealWorld dataset by 10 ms, 100 ms, and 500 ms, except the anchor (reference) device.

Table 4 shows the classification performance for two anchor (reference) devices, 'waist' and 'shin'. The results show that there is no significant difference in the classification performance of GSL—less than 0.006 difference in the F1 score, regardless of the time synchronisation error. It is conjectured that this result is caused by the ability of the feature extractor $f(\cdot)$ to ignore moderate timestamp errors during feature extraction.

TABLE 4

Comparison of classification performance (average and standard deviation of macro F1 scores) for different time synchronisation errors.

| Anchor device | Time Synchronisation error | | | |
|---|---|---|---|---|
| (RealWorld) | 0 ms | 10 ms | 100 ms | 500 ms |
| waist | 0.806 (0.070) | 0.804 (0.054) | 0.800 (0.062) | 0.808 (0.052) |
| shin | 0.806 (0.103) | 0.809 (0.101) | 0.809 (0.094) | 0.805 (0.101) |

A further investigation was carried out into the generalisability of GSL: whether the feature extractor $f(\cdot)$ trained using GSL is transferable to new devices, i.e., the ones that do not participate in pre-training of $f(\cdot)$. To this end, the further investigation pre-trained GSL-unseen on unlabelled data from all devices except one 'unseen' device. The pre-trained model was then finetuned and evaluated on the unseen device. For example, in the RealWorld dataset—if 'head' is chosen as the unseen device, the feature extractor was pre-trained on the rest of the devices to obtain, e.g. determine, GSL-unseen. Then, this investigation fine-tuned GSL-unseen with labelled data of 'head', and reported the classification performance using test data of 'head'.

Table 5 compares the classification performance between GSL and GSL-unseen when the model is evaluated at upper arm- and waist-worn devices in the RealWorld dataset. The results show that GSL-unseen shows comparable performance to GSL, even though the data of the unseen device is not used for pre-training the feature extractor. The decrease of F1 score is less than 1% in both cases. This gives an early indication that the feature extractor, $f(\cdot)$, trained using GSL is transferable across devices and can be useful for finetuning on unseen devices. More specifically, when a new, unseen device is added to the TSMDS setting, a training/implementing apparatus 102/device can reuse the pre-trained $f(\cdot)$ and just fine-tune it using a small amount of labelled data from the new device.

TABLE 5

Comparison of classification performance (average and standard deviation of macro F1 scores) between GSL and GSL-unseen in the RealWorld dataset.

| Device for testing | GSL | GSL-unseen |
|---|---|---|
| upper arm | 0.772 (0.042) | 0.764 (0.063) |
| waist | 0.806 (0.070) | 0.792 (0.072) |

Figure 10:
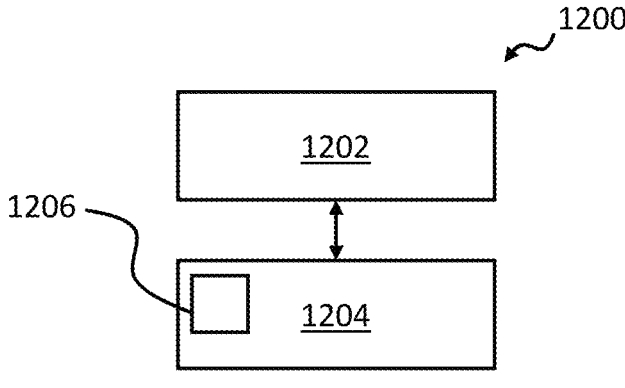
FIG. 10 shows an example of an apparatus.

FIG. 10 illustrates an example of a controller 1200, implemented in an apparatus 102, a sensor device 106, a sensor 108 and/or a subject 104. Implementation of a controller 1200 may be as controller circuitry. The controller 1200 may be implemented in hardware alone, have certain aspects in software including firmware alone or can be a combination of hardware and software (including firmware).

As illustrated in FIG. 10 the controller 1200 may be implemented using instructions that enable hardware functionality, for example, by using one or more executable instructions of one or more computer programs 1206 in one or more general-purpose or special-purpose processors 1202 (e.g. central processing unit (CPU) and/or graphical processing unit GPU) that may be stored on a one or more computer readable storage mediums (disk, memory etc.) to be executed by such the one or more processors 1202.

The processor 1202 is configured to read from and write to the at least one memory 1204. The processor 1202 may also comprise an output interface via which data and/or commands are output by the processor 1202 and an input interface via which data and/or commands are input to the processor 1202.

Further, the controller 1200 can have one or more communication interfaces to connect the apparatus 102, one or more sensor devices 108A-108D, one or more sensors 108A-108D and/or the subject 104 to each other.

Further, the controller 1200 can have one or more input user interfaces to receive one or more inputs from a user of the controller, and further, the controller 1200 can have one or more output user interfaces to control an output device to render one or more outputs to the user.

The memory 1204 stores the one or more computer programs 1206 comprising computer program instructions (computer program code) that controls the operation of the apparatus 102 when loaded into the processor 1202. The computer program instructions, of the computer program 1206, provide the logic and routines that enables the apparatus to perform the methods illustrated in FIGS. 3, 4, 5. The processor 1202 by reading the memory 1204 is able to load and execute the computer program 1206.

The apparatus 102, sensor device 106, sensor 108 and/or a subject 104, therefore comprises, in some examples:
at least one processor 1202; and
at least one memory 1204 including at least one computer program code;
the at least one memory 1204 and the at least one computer program code configured to, with the at least one processor 1202, cause the apparatus 102, sensor device 106, sensor 108 and/or a subject 104 to execute one or more functions as defined in the at least one computer program code.

In some examples, the at least one computer program code defines one or more functions;
obtain, e.g. receive, a plurality of sets of time-aligned unlabelled data, wherein the sets correspond to different ones of a plurality of sensors;
obtain, e.g. determine, statistical separation information, indicative of statistical separation of at least portions of individual ones of the sets from at least a portion of a reference set;
mark a first sample, of a first set of the plurality of sets, as a positive sample, in dependence on the statistical separation information indicating a first statistical similarity of at least a portion of the first set to the at least a portion of the reference set and in dependence on the first sample being time-aligned relative to a reference time;
mark a second sample, of a second set of the plurality of sets, as a negative sample, in dependence on the statistical separation information indicating a second, lower statistical similarity, of at least a portion of the second set to the at least a portion of the reference set, and further in dependence on the second sample being time-misaligned relative to the reference time; and provide the positive sample and the negative sample for training a computational model.

Figure 11:
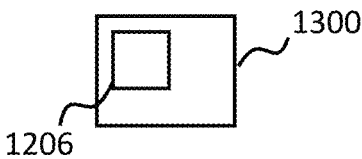
FIG. 11 shows an example of a computer product.

As illustrated in FIG. 11, the computer program 1206 may arrive at the apparatus 102, the sensor device 106, the sensor 108 and/or the subject 104 via any suitable delivery mechanism 1300. The delivery mechanism 1300 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 1206. The delivery mechanism may be a signal configured to reliably transfer the computer program 1206. The apparatus 102 may propagate or transmit the computer program 1206 as a computer data signal.

In some examples; the computer program instructions or code for causing an apparatus to perform at least the following:

causing obtaining, e.g. receiving, of a plurality of sets of time-aligned unlabelled data, wherein the sets correspond to different ones of a plurality of sensors;

causing obtaining, e.g. determining, of statistical separation information, indicative of statistical separation of at least portions of individual ones of the sets from at least a portion of a reference set;

causing marking of a first sample, of a first set of the plurality of sets, as a positive sample, in dependence on the statistical separation information indicating a first statistical similarity of at least a portion of the first set to the at least a portion of the reference set and in dependence on the first sample being time-aligned relative to a reference time;

causing marking of a second sample, of a second set of the plurality of sets, as a negative sample, in dependence on the statistical separation information indicating a second, lower statistical similarity, of at least a portion of the second set to the at least a portion of the reference set, and further in dependence on the second sample being time-misaligned relative to the reference time; and causing providing of the positive sample and the negative sample for training a computational model.

The computer program instructions may be comprised in a computer program, a non-transitory computer readable medium, a computer program product, a machine readable medium. In some but not necessarily all examples, the computer program instructions may be distributed over more than one computer program.

Although the memory 1204 is illustrated as a single component/circuitry it may be implemented as one or more separate components/circuitry some or all of which may be integrated/removable and/or may provide permanent/semi-permanent/dynamic/cached storage.

Although the processor 1202 is illustrated as a single component/circuitry it may be implemented as one or more separate components/circuitry some or all of which may be integrated/removable. The processor 1202 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialised circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The methods of 300, 400 and/or 500 can be implemented, respectively, with the one or more circuitries as described above.

The blocks illustrated in the FIGS. 3, 4, 5 may represent steps in a method and/or sections of code in the computer program 1206. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

In some but not necessarily all examples, a device 106 is configured to communicate data from the device 106 with or without local storage of the data in a memory 1204 at the device 106 and with or without local processing of the data by circuitry or processors at the device 106.

The data may be stored in processed or unprocessed format remotely at an apparatus 102. The data may be stored in the Cloud.

The data may be processed remotely at one or more devices. The data may be partially processed locally and partially processed remotely at one or more devices.

The data may be communicated to the remote devices wirelessly via short range wireless communications such as WLAN (wireless local area network) or Bluetooth®, for example, or over long-range cellular radio communication such as 3G, 4G, 5G, 6G or any further evolution/generation. The apparatus may comprise a communications interface such as, for example, a radio transceiver for communication of data.

The device(s) 106 and/or apparatus 102 may be part of the Internet of Things (IoT) forming part of a larger, distributed network.

The processing of the data, whether local or remote, may be for the purpose of health monitoring, data aggregation, patient monitoring, vital signs monitoring or other purposes.

The processing of the data, whether local or remote, involves artificial intelligence or machine learning algorithms. The data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

The processing of the data, whether local or remote, may produce an output. The output may be communicated to the apparatus 102 where it may produce an output The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualised networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning, then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning, then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. A method comprising:

obtaining one or more sets of time-aligned unlabeled data corresponding to different ones of a plurality of sensors;

obtaining statistical separation information, indicative of statistical separation of at least portions of respective ones of the one or more sets of time-aligned unlabeled data from at least a portion of a reference set associated with a reference class;

marking a first sample, of a first set of the one or more sets of time-aligned unlabeled data, as a positive sample, in dependence on the statistical separation information indicating a first statistical similarity of at least a portion of the first set to the at least a portion of the reference set and in dependence on the first sample being time-aligned relative to a reference time, wherein marking the first sample as the positive sample comprises associating the first sample with a positive label for the reference class;

marking a second sample, of a second set of the one or more sets of time-aligned unlabeled data, as a negative sample, in dependence on the statistical separation information indicating a second, lower statistical similarity, of at least a portion of the second set to the at least a portion of the reference set, and further in dependence on the second sample being time-misaligned relative to the reference time, wherein marking the second sample as the negative sample comprises associating the second sample with a negative label for the reference class; and providing the positive sample and the negative sample for training a computational model.

2. The method of claim 1, wherein (i) the time-aligned unlabeled data of the sets indicate a time-varying context of a common subject, (ii) the first sample and the second sample are within nonoverlapping time windows, and (iii) the plurality of the sensors comprises sensors having a same sensing modality.

3. The method of claim 1, wherein the time-aligned unlabeled data comprises one or more of: motion-dependent data; pressure-dependent data; image frame data; audio data; radio signal data; electricity data; or force-dependent data.

4. The method of claim 1, wherein the marking of the second sample as the negative sample comprises assigning a training weight to the second set or sample based on the second, lower statistical similarity.

5. The method of claim 1, further comprising training the computational model based on one or more positive samples including the positive sample of claim 1 and based on multiple negative samples including the negative sample of claim 1.

6. The method of claim 5, wherein training the computational model comprises executing a loss function to train a feature extractor, wherein the loss function is configured to determine a loss value based on an aggregate of the positive samples and based on an aggregate of the multiple negative samples and based on the reference set.

7. The method of claim 5, wherein training the computational model comprises providing further positive and negative samples based on one or more of: different reference times; or different reference sets, and comprises determining the loss value iteratively, based on the further positive and negative samples, until a convergence criterion is satisfied.

8. The method of claim 1, wherein training the computational model comprises training a classifier based on a labeled dataset associated with the reference set.

9. The method of claim 1, further comprising:
obtaining the one or more sets of unlabeled data, each set comprising timestamp information; and
time-aligning the sets of unlabeled data based on the timestamp information, to obtain the sets of time-aligned unlabeled data.

10. The method of claim 1, further comprising:
training the computational model based on the positive sample and the negative sample and the reference set; and
associating or sending the trained computational model to a device with which the reference set is associated.

11. The method of claim 1, wherein (i) the plurality of sensors are associated with two or more devices, (ii) the one or more sets of time-aligned unlabeled data correspond to two or more devices, (iii) the two or more devices are configured to be time-aligned by a primary reference clock that is synchronizing a network to which the two or more devices are connected, and (iv) the method further comprises:
selecting a reference sample from at least the portion of the reference set;
generating a transformed version of the reference sample by applying a pre-defined rotation; and
providing the positive sample, the negative sample, and the transformed version of the reference sample for training the computational model.

12. The method of claim 11, further comprising:
providing the positive sample, the negative sample, and the transformed version of the reference sample to a neural network to determine one or more feature embeddings.

13. A device comprising:
at least one processor; and
at least one memory including computer program code;
the at least one memory storing instructions that, when executed by the at least one processor, cause the device at least to:
record data of a sensor associated with the device, wherein the device and one or more other devices associated with a same user are configured to be time-aligned by a primary reference clock that is synchronizing a network to which the device and the one or more other devices are connected;
define a set of the sensor data as a reference set;
send the reference set to an apparatus for training a computational model;
receive from the apparatus a trained computational model, trained based on the sent reference set and one or more of sets of time-aligned unlabeled data from one or more other sensors associated with the one or more other devices;
determine an inference based on applying further data from the sensor to the trained computational model; and
control a function of the device based on the inference.

14. The device of claim 13, further cause to
send an indication of a modality of the reference set for training the computational model; and
receive from the apparatus the trained computational model, trained based on the sent reference set, the indication of a modality of the reference set and the plurality of sets of time-aligned unlabeled data from one or more of other sensors.

15. The device of claim 14, wherein the modality of the reference set comprises one or more of
one or more measured physical attributes, features or properties relating to an input used by a specific sensor, or
one or more attributes, features or properties relating to a subject being sensed.

16. The device of claim 15, wherein the one or more of the other sensors are related to the subject being sensed.

17. The device of claim 15, wherein the subject refers to one or more of a device, user, object, space or scene that is being sensed.

18. The device of claim 13, further cause to send to the apparatus
a current computational model used in the device; or
an indication of the current computational model used in the device.

19. The device of claim 13, wherein the training is based on:

a) a marking of a first sample, of a first set of the one or more of sets, as a positive sample, in dependence on statistical separation information indicating a first statistical similarity of at least a portion of the first set to the at least a portion of the reference set and in dependence on the first sample being time-aligned relative to a reference time; and b) a marking of a second sample, of a second set of the one or more of sets, as a negative sample, in dependence on statistical separation information indicating a second, lower statistical similarity, of at least a portion of the second set to the at least a portion of the reference set, and further in dependence on the second sample being time-misaligned relative to the reference time.

20. An apparatus comprising:

at least one processor; and at least one memory including computer program code;

the at least one memory storing instructions that, when executed by the at least one processor, cause the device at least to:

obtain one or more sets of time-aligned unlabeled data corresponding to different ones of a plurality of sensors;

obtain statistical separation information, indicative of statistical separation of at least portions of respective ones of the one or more sets of time-aligned unlabeled data from at least a portion of a reference set associated with a reference class;

mark a first sample, of a first set of the one or more sets of time-aligned unlabeled data, as a positive sample, in dependence on the statistical separation information indicating a first statistical similarity of at least a portion of the first set to the at least a portion of the reference set and in dependence on the first sample being time-aligned relative to a reference time, wherein marking the first sample as the positive sample comprises associating the first sample with a positive label for the reference class;

mark a second sample, of a second set of the one or more sets of time-aligned unlabeled data, as a negative sample, in dependence on the statistical separation information indicating a second, lower statistical similarity, of at least a portion of the second set to the at least a portion of the reference set, and further in dependence on the second sample being time-misaligned relative to the reference time, wherein marking the second sample as the negative sample comprises associating the second sample with a negative label for the reference class; and provide the positive sample and the negative sample for training a computational model.

* * * * *